United States Patent
Baker

(10) Patent No.: US 10,414,320 B2
(45) Date of Patent: Sep. 17, 2019

(54) TRAILER CONVEYOR SYSTEM AND SPRING HINGE FOR A LOAD DECK PANEL

(71) Applicant: Wabash National, L.P., Lafayette, IN (US)

(72) Inventor: Leonard W. Baker, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/441,554

(22) Filed: Feb. 24, 2017

(65) Prior Publication Data

US 2017/0158107 A1    Jun. 8, 2017

Related U.S. Application Data

(63) Continuation-in-part of application No. 15/279,802, filed on Sep. 29, 2016.

(60) Provisional application No. 62/234,959, filed on Sep. 30, 2015.

(51) Int. Cl.

| | |
|---|---|
| B60P 1/52 | (2006.01) |
| E05D 11/08 | (2006.01) |
| E05D 5/04 | (2006.01) |
| E05D 5/02 | (2006.01) |
| B60P 1/36 | (2006.01) |

(52) U.S. Cl.
CPC ............ B60P 1/52 (2013.01); E05D 5/0207 (2013.01); E05D 5/043 (2013.01); E05D 11/082 (2013.01); B60P 1/36 (2013.01); Y10T 16/593 (2015.01)

(58) Field of Classification Search
CPC ......... B60P 1/52; Y10T 16/593; B62D 33/08; B65G 21/00; E05D 5/0207; E05D 5/043; E05D 11/082

USPC ..... 16/281; 105/372, 375; 198/860.1, 860.2; 414/529, 532–534, 679
See application file for complete search history.

(56) References Cited

U.S. PATENT DOCUMENTS

| | | | |
|---|---|---|---|
| 2,505,467 A * | 4/1950 | Eilert | E06B 11/04 16/281 |
| 3,561,622 A | 2/1971 | Dioguardi et al. | |
| 3,875,871 A * | 4/1975 | Thornton | B61D 3/04 105/375 |
| 4,002,008 A * | 1/1977 | Grasson | B65B 15/00 100/153 |
| 4,664,583 A | 5/1987 | Gust | |

(Continued)

OTHER PUBLICATIONS

Cisco-Eagle [online]; Copyright 2017 Cisco-Eagle; Delivery Truck Folding Conveyor specification sheet; <http://www.cisco-eagle.com/catalog/c-1874-delivery-truck-folding-conveyor.aspx>.

*Primary Examiner* — James Keenan
(74) *Attorney, Agent, or Firm* — Quarles & Brady LLP

(57) ABSTRACT

A conveyor system for loading a trailer is disclosed. The conveyor system comprises a spring hinge comprising a hinge butt portion configured to be coupled to a surface of a trailer and a hinge strap portion configured to be coupled to a bottom surface of the load deck panel. The spring hinge further includes a hinge pin coupling the hinge butt portion and the hinge strap portion, the hinge pin forming a pivot axis and a position-assist element positioned below a bottom surface of the load deck panel. The position-assist element is configured to assist in hinged movement of the load deck panel about the pivot axis between a closed position in which the load deck panel is substantially vertical and an open position in which the load deck panel is substantially horizontal.

4 Claims, 23 Drawing Sheets

(56) References Cited

U.S. PATENT DOCUMENTS

| | | | | |
|---|---|---|---|---|
| 5,145,310 A | * | 9/1992 | Calzone | B60P 1/43 14/71.3 |
| 5,361,481 A | * | 11/1994 | Lloyd | B65G 1/0407 29/407.01 |
| 5,598,595 A | * | 2/1997 | Flinchum | B60P 1/438 14/69.5 |
| 6,109,579 A | * | 8/2000 | Huang | B60P 7/0807 248/294.1 |
| 6,200,082 B1 | | 3/2001 | Molenaar et al. | |
| 6,494,280 B1 | * | 12/2002 | Friend | E05F 1/1033 16/308 |
| 6,588,624 B1 | * | 7/2003 | Connors | E05D 7/12 16/341 |
| 6,612,426 B1 | * | 9/2003 | Guerra | B65G 21/06 198/841 |
| 7,293,813 B2 | * | 11/2007 | Squyres | B60P 1/00 105/372 |
| 8,051,976 B2 | * | 11/2011 | Koeda | B65G 21/06 198/837 |
| 8,894,122 B2 | * | 11/2014 | Gilbert | B62D 25/2054 296/24.44 |
| 9,702,175 B2 | * | 7/2017 | Jaworski | B60P 1/00 |
| 2002/0060145 A1 | * | 5/2002 | Doerfer | B65G 37/02 198/860.2 |
| 2003/0172497 A1 | * | 9/2003 | Cha | E05D 11/082 16/342 |
| 2007/0006422 A1 | * | 1/2007 | Lu | G06F 1/1601 16/337 |
| 2014/0158653 A1 | * | 6/2014 | Evans | E05D 5/0238 211/90.02 |

* cited by examiner

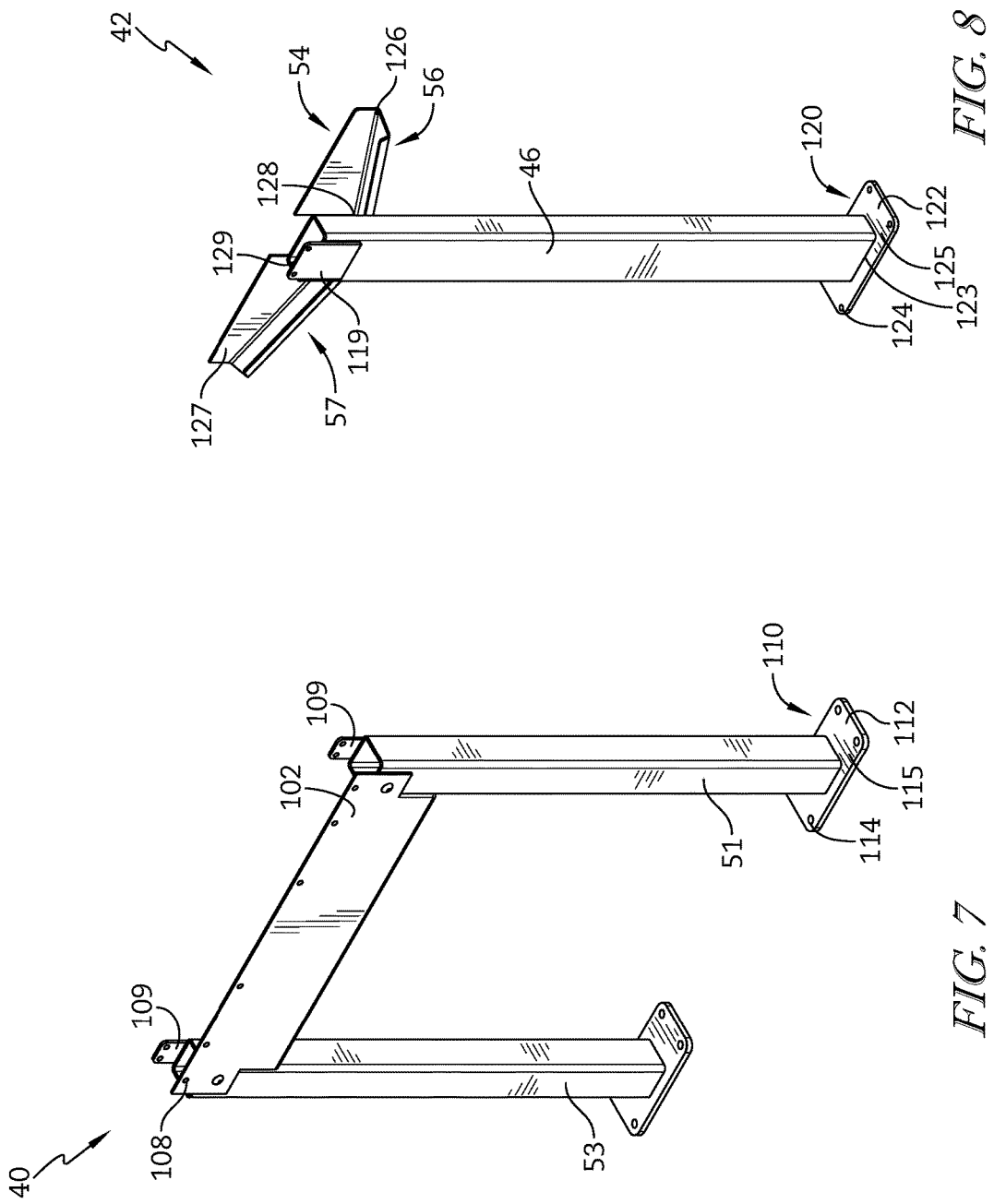

TRAILER CONVEYOR SYSTEM AND SPRING HINGE FOR A LOAD DECK PANEL

CROSS-REFERENCE TO RELATED APPLICATIONS

The present invention is a continuation-in-part of U.S. patent application Ser. No. 15/279,802, filed Sep. 29, 2016, and entitled "Trailer Conveyor System", which claims the benefit of U.S. Provisional Application No. 62/234,959, filed Sep. 30, 2015, and entitled "Trailer Conveyor System." The disclosures of such applications are hereby incorporated by reference herein in their entireties.

FIELD OF THE DISCLOSURE

The present disclosure relates generally to conveyor trailers, and more specifically to conveyor systems for loading and unloading conveyor trailers.

BACKGROUND

A conveyor system can be included in a trailer to generally provide assistance during loading and unloading of the cargo from the trailer. During loading of the trailer, cargo can be placed on the conveyor system at the rear of the trailer and quickly travel a desired distance to reach a location where the cargo can be removed from the conveyor and secured for transport. During unloading of the trailer, cargo can be placed on the conveyor system and quickly travel to the rear of the trailer to be removed from the trailer. Conveyor systems are designed to handle a variety of cargo and can incur damages during the loading and unloading processes. As such, improving the durability and usability of the conveyor systems is desired.

SUMMARY

The present disclosure may comprise one or more of the following features and combinations thereof.

A conveyor system for loading a trailer that may include a support frame adapted to couple to a floor of a trailer, a conveyance mechanism coupled to the support frame and configured to extend from a rear of the trailer toward a front of the trailer, and a conveyor rail arranged to extend between and interconnect the support frame and the conveyance mechanism. At least one load deck panel may be hingedly connected to a wall of the trailer and may have a closed position in which the load deck panel is adjacent the wall and an open position in which the load deck panel is adjacent the conveyor rail. The load deck panel may include a hinge assembly that may include a hinge butt portion configured to be coupled to a surface of the trailer, a hinge strap portion configured to be coupled to a bottom surface of the load deck panel, a hinge pin extending along a pivot axis and positioned below the bottom surface of the load deck panel, the hinge pin coupling the hinge butt portion and the hinge strap portion, and a position-assist element configured to assist in hinged movement of the load deck panel about the pivot axis between an open position and a closed position. The support frame may include a rear leg positioned at a first end of the conveyance mechanism including first and second leg towers spaced from one another and a support member connecting the first and second leg towers. The first and second leg towers may be configured to be attached to the floor of the trailer and the support member may be coupled to the conveyor rail. The support frame may further include at least one belly leg including a single belly leg tower having a first end configured to be attached to the floor of the trailer and a bracket connected to a second end of the belly leg tower. The bracket may be coupled to the conveyor rail.

In some embodiments, the hinge butt portion may be coupled to a bracket that is coupled to a wall of the trailer.

In some embodiments, the hinge butt portion may be coupled to a wall of the trailer.

In some embodiments, the position-assist element may be a torsion spring that may be wound around a portion of the hinge pin outside of the hinge butt portion.

In some embodiments, the position-assist element may be a spring that has a first end and a second end. The first end may extend away from the hinge pin into contact the load deck panel, and the second end may extend away from the hinge pin into contact with a surface within the trailer. The spring hinge may further have a spring constant that selectively allows movement of the load deck panel between the open and closed positions.

In some embodiments, the position-assist element may be a spring that extends through an aperture in the load deck panel. The spring may have a first end and a second end, the first end and the second end may have hooks that couple a bottom surface of the load deck panel to the wall of the trailer.

In some embodiments, the position-assist element may be a torsion bar that extends through the hinge butt portion. The torsion bar may have a first end and a second end, the first end may extend away from the hinge pin into contact with the load deck panel, and the second end may extend away from the hinge pin into contact with a surface within the trailer.

In some embodiments, the support frame may further include a second belly leg that may include a single belly leg tower having a first end configured to be attached to the floor of the trailer and a bracket connected to a second end of the second belly leg. The bracket may be coupled to the conveyor rail.

In some embodiments, the conveyor system may further include an upper coupler leg positioned at a second end of the conveyance mechanism opposite the first end. The upper coupler leg may include first and second legs having first ends configured to be attached to the floor of the trailer and a brace connecting second ends of the first and second legs. The brace may be coupled to the conveyor rail, wherein a first distance between the rear tower leg and first belly leg, a second distance between the first and second belly legs, and third distance between the second belly leg and the upper coupler leg may be equal.

In some embodiments, the support frame may further include a table leg including a single table tower having a first end configured to be attached to the floor of the trailer and a bracket connected to a second end of the table leg, wherein the bracket is coupled to the conveyor rail.

In some embodiments, the table leg may be positioned between the second end of the conveyance mechanism and the upper coupler leg.

A conveyor system for loading a trailer comprising a spring hinge for a load deck panel is disclosed. The spring hinge may include a hinge butt portion configured to be coupled to a surface of a trailer, a hinge strap portion configured to be coupled to a bottom surface of the load deck panel, a hinge pin coupling the hinge butt portion and the hinge strap portion, the hinge pin forming a pivot axis, and a position-assist element positioned below a bottom surface of the load deck panel. The position-assist element may be configured to assist in hinged movement of the load deck panel about the pivot axis between a closed position in which the load deck panel is substantially vertical and an open position in which the load deck panel is substantially horizontal.

In some embodiments, the hinge butt portion may be coupled to a bracket that is coupled to a wall of the trailer.

In some embodiments, the hinge butt portion may be coupled to a wall of the trailer.

In some embodiments, the position-assist element may be a torsion spring that is wound around a portion of the hinge pin outside of the hinge butt portion.

In some embodiments, the position-assist element may be a torsion spring that is wound around a secondary hinge pin within the hinge butt portion.

In some embodiments, the position-assist element may have a first end and a second end. The first end may extend away from the hinge pin into contact the load deck panel, and the second end may extend away from the hinge pin into contact with a surface within the trailer.

In some embodiments, the position-assist element may have a first end and a second end. The first end may extend away from the hinge pin into contact with the hinge strap portion, which may be fixed to the load deck panel, and the second end may extend away from the hinge pin into contact with a surface within the trailer.

In some embodiments, the position-assist element may include a spring having a spring constant. The spring constant may generate a torsional force that is translated into a linear force at first and second ends of the spring to retain the load deck panel in a vertical position when desired, but also retain the load deck panel in a horizontal position when desired.

These and other features of the present disclosure will become more apparent from the following description of the illustrative embodiments.

BRIEF DESCRIPTION OF THE DRAWINGS

FIG. 7 is a perspective view of a rear leg of the conveyor system of FIG. 1;

FIG. 8 is a perspective view of a belly leg of the conveyor system of FIG. 1;

DETAILED DESCRIPTION OF THE DRAWINGS

Figure 1:
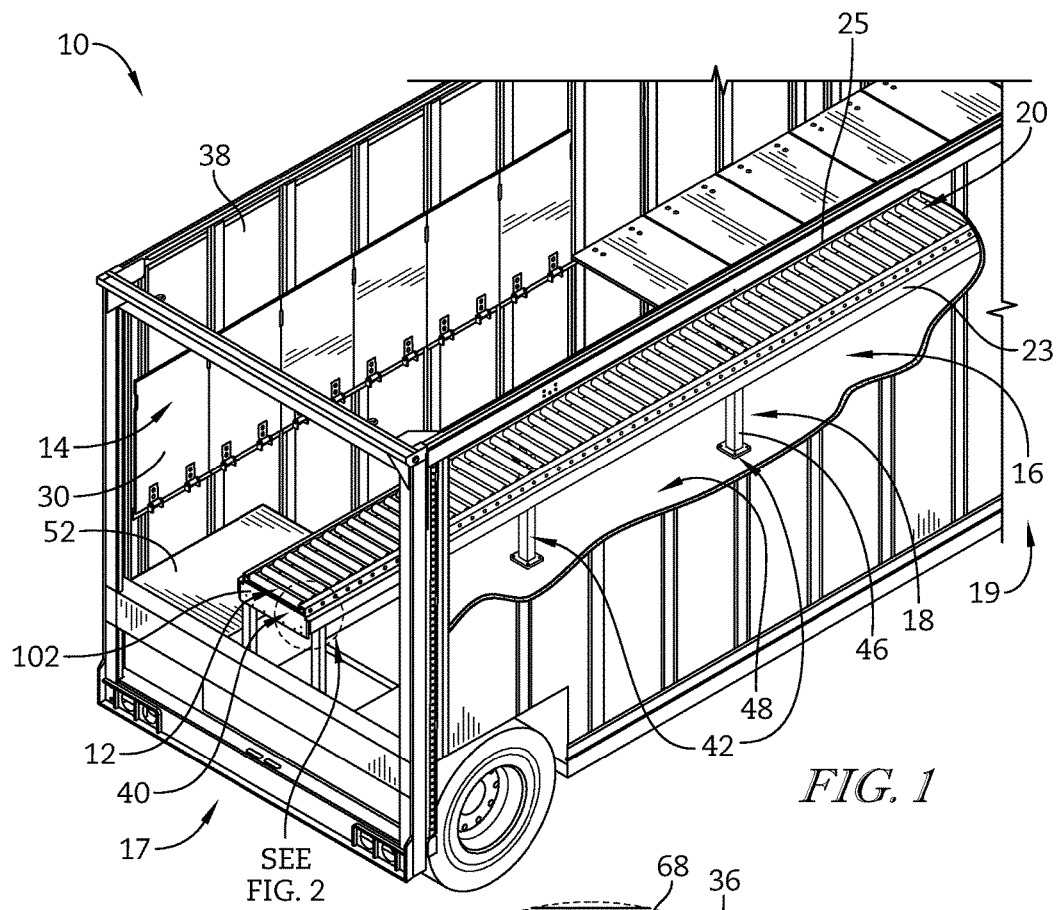
FIG. 1 is a perspective view of a conveyor trailer depicting a conveyor system for loading a conveyor trailer.

For the purposes of promoting an understanding of the principles of the disclosure, reference will now be made to a number of illustrative embodiments illustrated in the drawings and specific language will be used to describe the same. While the concepts of this disclosure are described in relation to a conveyor trailer for a tractor, it will be understood that that they are equally applicable to other trailers generally, and more specifically to drop-deck trailers, pup trailers, conventional flat-bed and/or box or van type trailers, examples of which include, but should not be limited to, straight truck bodies, small personal and/or commercial trailers, storage facilities or storage containers where cargo may be loaded or unloaded via a conveyor, and the like.

A conveyor trailer 10 can be loaded and unloaded using a conveyor system 12, as shown in FIG. 1. The conveyor trailer 10 may comprise the conveyor system 12, a load deck system 14, and a floor 16, as shown in FIG. 1. The conveyor system 12 is mounted to the floor 16 and is used to load and unload cargo into and out of the conveyor trailer 10. In illustrative embodiments, the conveyor system 12 is comprised of steel, although any suitable metal, metal alloy, or polymeric material suitable for the conveyor system 12 can be used.

Figure 2:
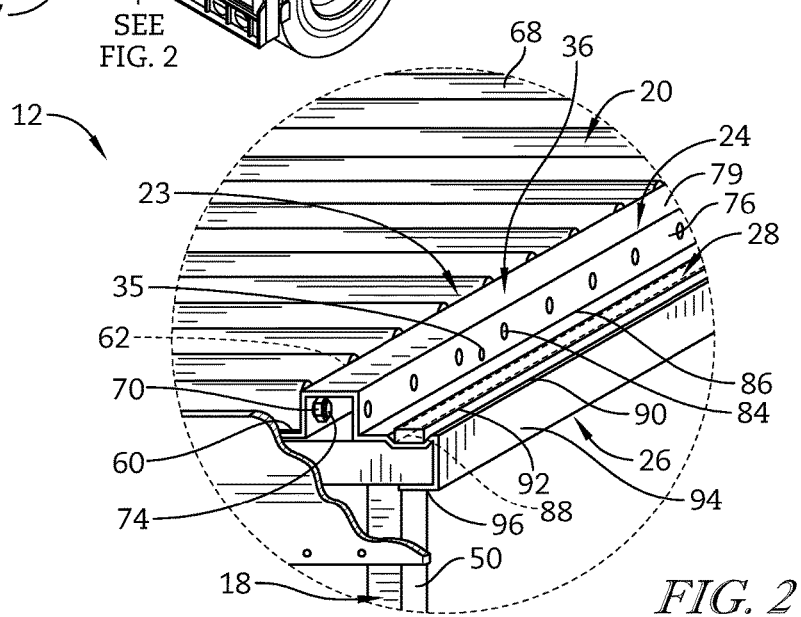
FIG. 2 is a detailed view of a portion of the conveyor system of FIG. 1.

The conveyor system 12 includes a support frame 18, a set of rollers 20, and a conveyor rail 22, as shown in FIGS. 1 and 2. The support frame 18 is adapted to couple the conveyor system 12 to the floor 16 of the conveyor trailer 10, and support the set of rollers 20 and the conveyor rail 22. The set of rollers 20 improves the efficiency of transporting cargo from the rear 17 of the trailer towards the front 19 of the trailer so the cargo can be quickly secured. Illustratively, the cargo can be positioned on the load deck system 14. The conveyor rail 22 extends between and interconnects the set of rollers 20 to the support frame 18, as shown in FIGS. 1 and 2.

Figure 3:
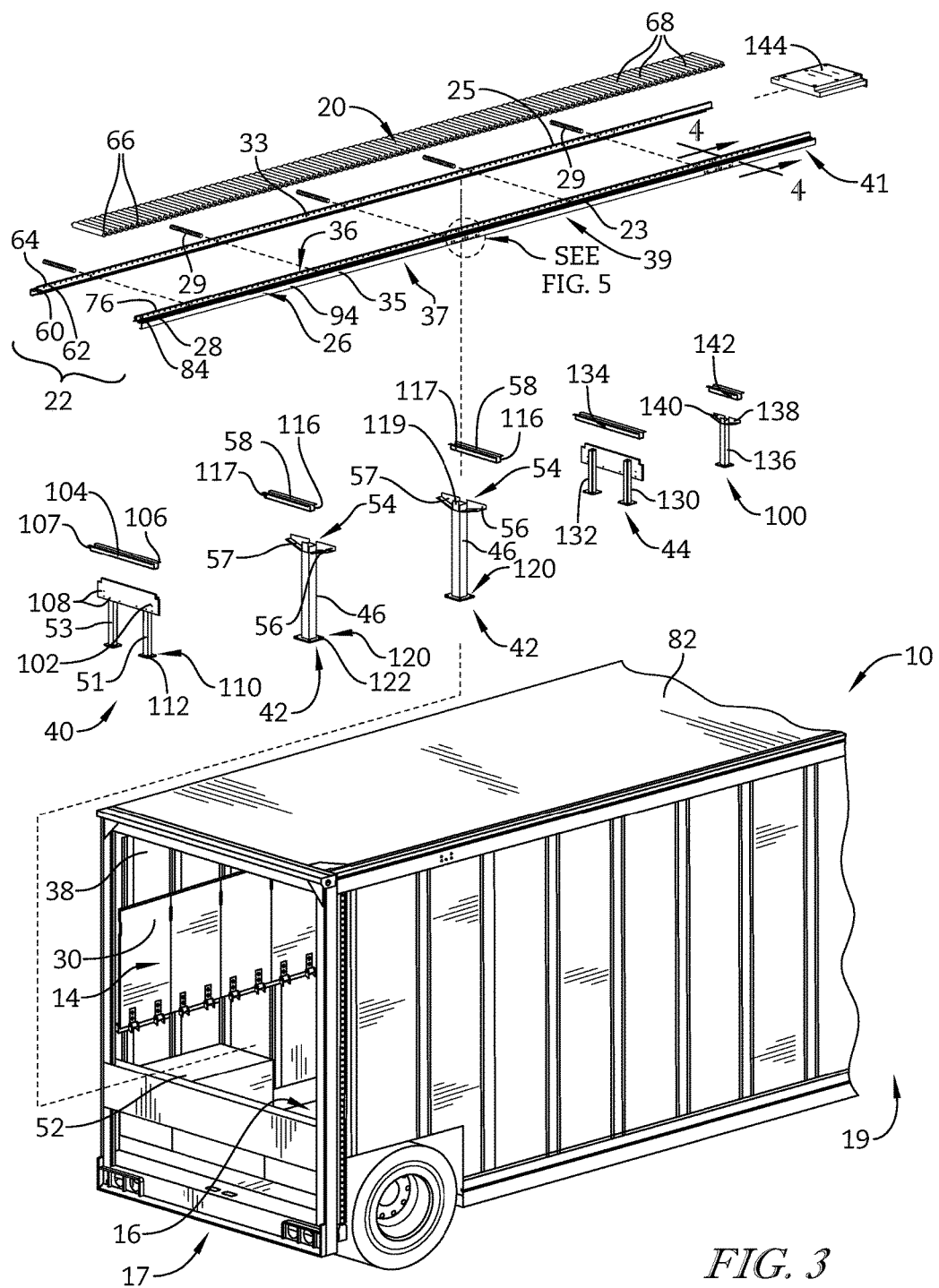
FIG. 3 is an exploded assembly view of the conveyor trailer, the conveyor system for loading the conveyor trailer, and the support frame and conveyor rails of the conveyor system of FIG. 1.

The conveyor rail 22 includes first and second conveyor rails 23, 25. While the conveyor rail 23 will be discussed in detail, the conveyor rail 25 is identical to the conveyor rail 23. The conveyor rail 23 includes a roller support 24, a frame mount 26, and a load deck support 28 that is arranged to extend between and interconnect the roller support 24 and frame mount 26, as shown in FIGS. 2 and 3. The frame mount 26 couples the conveyor rail 23 to the support frame 18. The load deck support 28 is configured to receive a bumper 92 and supports the load deck panels 30 when the load deck panels 30 are in the horizontal load position. The roller support 24 couples the set of rollers 20 to the conveyor rail 23. The roller support 24 further includes a roller guard 36 that protects the set of rollers 20 from an external force during loading or unloading of the conveyor trailer 10.

The conveyor trailer 10 includes a load deck system 14 attached to the walls 38 of the conveyor trailer 10, as shown in FIG. 1. The load deck system 14 includes a plurality of load deck panels 30 hingedly attached to the walls 38. The load deck panels 30 can be vertically oriented or can rotate to a horizontal position to support cargo in the conveyor trailer 10. When the load deck panels 30 are in their horizontal configuration, they extend inwardly from the walls 38 and rest on the bumper 92 of the load deck support 28 of the conveyor system 12. Users can transfer cargo from the rear 17 of the trailer down the conveyor system 12 to efficiently load cargo on the floor 16, and the horizontally oriented load deck panels 30. The load deck system 14 may be similar to the load deck system of U.S. Pat. No. 8,894, 122, the disclosure of which is hereby incorporated by reference herein in its entirety.

Figure 6:
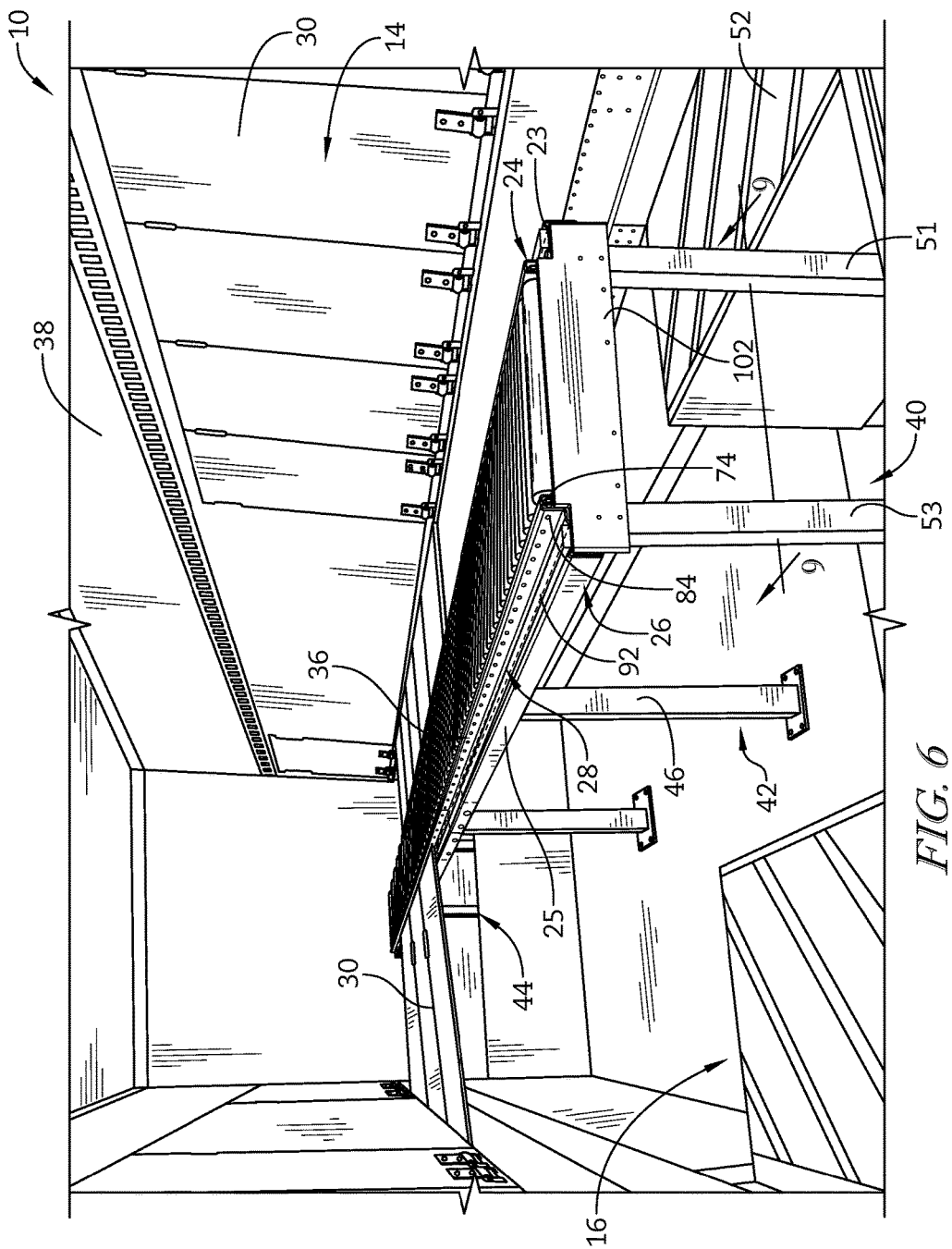
FIG. 6 is a perspective view of the conveyor system of FIG. 1 depicting the conveyor rails supporting load deck panels.

The conveyor system 12 is coupled to the floor 16 by the support frame 18 as shown in FIGS. 1 and 6. The support frame 18 includes a rear leg 40, at least one belly leg 42, and an upper coupler leg 44 as shown in FIG. 3. The rear leg 40 includes two towers 50 that are located at the rear 17 of the trailer between the wheel wells 52. The belly leg 42 includes a single belly tower 46 to maximize the packing space on the floor 16 in the belly 48 of the conveyor trailer 10, as shown in FIG. 8. The belly leg 42 includes a gusset bracket 54 arranged to extend between and interconnect the conveyor rail 22 to the support frame 18. The gusset bracket 54 includes a first arm 56 and a second arm 57 that extend outwardly from the belly leg 42 and a channel support 58 that couples to the conveyor rails 22.

Figure 5:
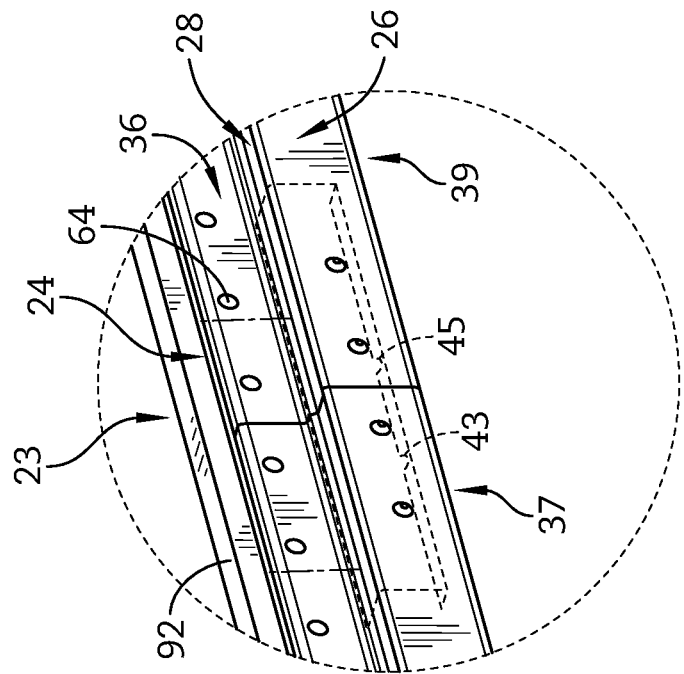
FIG. 5 is a detailed view of a portion of the conveyor rail of the conveyor system of FIG. 1.

The conveyor rail 23 includes a rear segment 37, a middle segment 39, and a front segment 41, as shown in FIG. 3. The middle segment 39 extends between and interconnects the rear segment 37 and the front segment 41. The rear segment 37 is coupled to the middle segment 39 with a splice bracket 43 and the middle segment 39 is coupled to the front segment 41 with a splice bracket 43, as shown in FIG. 5. Splice bracket 43 includes four apertures 45 configured to couple with the conveyor rail 22. In other embodiments, the conveyor rail 23 may be a singular piece.

The conveyor rail 23 includes a roller support 24 coupled to the frame mount 26 of the conveyor rail 23, and a support rod 29, as shown in FIGS. 2 and 3. The support rod 29 spans between the first conveyor rail 23 and the second conveyor rail 25 to add rigidity to the conveyor system 12. The rollers 20 are fastened to the first and second conveyor rails 23, 25 with fasteners 74 configured to couple to the rollers 20 through apertures 70 formed in the first and second conveyor rails 23, 25. Apertures 35 are also formed in the first and second conveyor rails 23, 25 and are configured to overlie the apertures 70 to allow access to the fasteners 74. As noted above, the first and second conveyor rails 23, 25 are identical and, thus, the conveyor rail 25 includes the same features as the conveyor rail 23.

Figure 4:
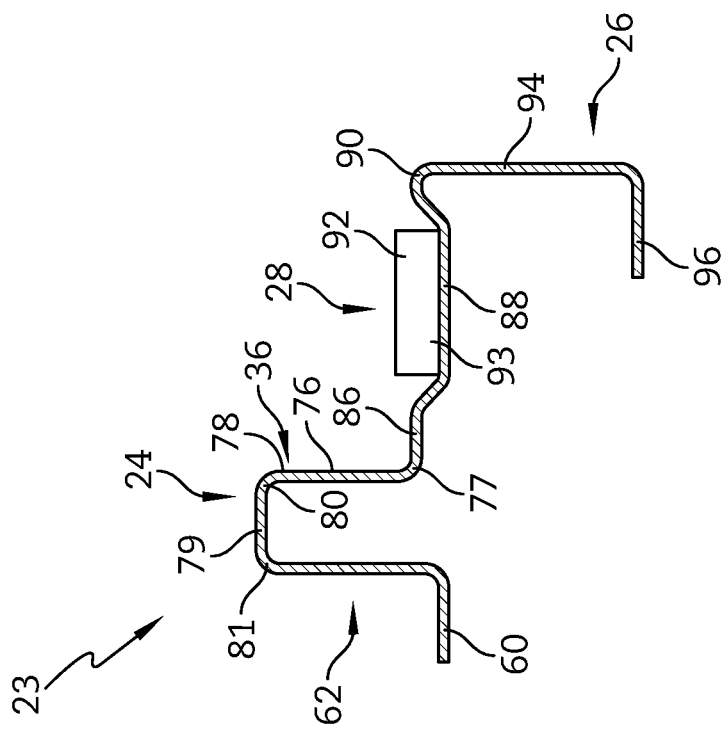
FIG. 4 is a cross section of a conveyor rail of the conveyor system of FIG. 1.

The roller support 24 includes the roller guard 36, a support tab 60, and a roller mount 62, as shown in FIG. 4. The roller guard 36 can be L-shaped and can extend vertically away from the load deck support 28 to couple with the roller mount 62. Illustratively, the roller guard 36 and the roller mount 62 cooperate to form an inverted U-shape. The support tab 60 is coupled to the roller support 24 and extends away horizontally from the roller support 24 to underlie the set of rollers 20. The support tab 60 is configured to cooperate with the support frame 18 to provide additional stiffness to the conveyor rail 23 (and the conveyor rail 25).

The roller mount 62 is formed to include an aperture 64, for example, in the shape of a hexagon that receives an axel 66 of a roller 68 from the set of rollers 20, as shown in FIG. 2. The roller mount 62 extends longitudinally from the front 19 of the conveyor trailer 10 to the rear 17 of the conveyor trailer 10 and is configured to support the set of rollers 20 so the rollers 68 maintain free rotation when in use. The axel 66 of each roller 68 is spring-loaded and the axels 66 extend into apertures 64 in each roller mount 62. In some embodiments, the roller mount 62 may extend partially along the length of the conveyor trailer 10.

The roller guard 36 can be L-shaped and can extend vertically away from the load deck support 28 to couple with the roller mount 62, as shown in FIGS. 4 and 5. The roller guard 36 includes a first segment 76 and a second segment 79. The first segment 76 couples at a first end 77 to the load deck support 28 and the first segment 76 extends vertically away from the load deck support 28 towards the second segment 79 at a generally perpendicular angle. The second segment 79 couples at a first end 80 to a second end 78 of the first segment 76 at a generally perpendicular angle. The second segment 79 extends horizontally away from the first segment 76 towards the roller mount 62 so that a second end 81 of the second segment 79 couples with the roller mount 62.

The arrangement of the first segment 76 and the second segment 79 of the roller guard 36 with the roller mount 62 provides a protective structure over the axels 66 of the rollers 68. Together, the roller guard 36 and the roller mount 62 provide a means for protecting the roller mount 62 from an external force applied to the roller support 24 so that damage to the rollers 68 and the roller mount 62 is minimized during loading or unloading of the conveyor trailer 10. However, other suitable means for protecting the axel may be provided as well.

The first segment 76 of the roller guard 36 is generally parallel with the roller mount 62 and is formed to include a plurality of apertures 84 that are configured to overlie the apertures 64 of the roller mount 62, as shown in FIGS. 2-5. The apertures 84 are sized to allow suitable tools to access the axels 66 of the rollers 20 during maintenance of the set of rollers 20 so that the conveyor rails 23, 25 do not need to be removed from the support frame 18. The first segment 76 couples at a first end 77 to the load deck support 28 to locate the first segment 76 between the load deck support 28 and the roller mount 62.

The load deck support 28 includes a roller guard mount 86, a bumper mount 88, and a frame edge 90, as shown in FIGS. 2 and 4. The bumper mount 88 is arranged to extend between and interconnect the roller guard mount 86 and the frame edge 90, as shown in FIG. 4. The bumper mount 88 is formed to receive a bumper 92 and is configured so that a bottom 93 of the bumper 92 is recessed below the roller guard mount 86 and the frame edge 90. The roller guard mount 86 is configured to extend between and interconnect the roller guard 36 with the bumper mount 88. The frame edge 90 is arranged to extend between and interconnect the bumper mount 88 with the frame mount 26. The load deck support 28 is configured to support the load deck panels 30 when the load deck panels 30 are horizontal. Illustratively, the load deck support 28 can support the load deck panels 30 in the presence or absence of cargo on the load deck panels 30.

The frame mount 26 includes a first segment 94 that is coupled to the frame edge 90 of the load deck support 28 so that the first segment 94 extends vertically downward at a generally perpendicular angle, and a second segment 96 is coupled to the first segment 94, as shown in FIG. 4. The second segment 96 extends at a generally perpendicular angle away from the first segment 94 towards the load deck support 28 so that the second segment 96 is generally parallel with and underlies the load deck support 28. The frame mount 26 is configured to locate a portion of the support frame 18 between the second segment 96 of the frame mount 26 and the load deck support 28. Together, the frame mount 26 and the load deck support 28 cooperate to mount the conveyor rails 23, 25 to the support frame 18. In illustrative embodiments, the second segment 96 is coupled with a portion of the support frame 18 with a fastener 98 (see FIG. 13).

Figure 12:
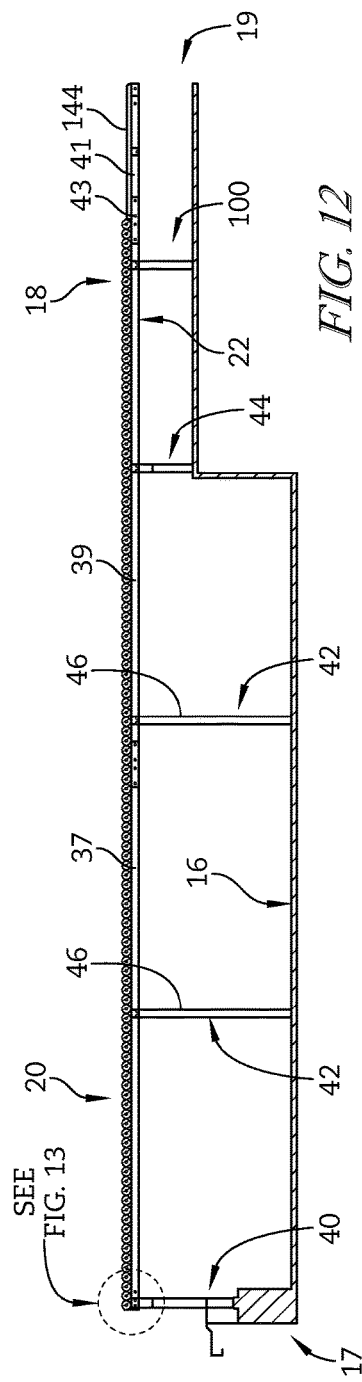
FIG. 12 is a cross-sectional view of the conveyor system of FIG. 1 taken generally along the lines 12-12 of FIG. 11.

In some embodiments, the support frame 18 of the conveyor system 12 can include the rear leg 40, two belly legs 42, an upper coupler leg 44, and a table leg 100 as shown in FIGS. 3, 6, and 12. Illustratively, the rear leg 40, the belly legs 42, the upper coupler leg 44, and the table leg 100 are located in spaced-apart relation along a longitudinal axis of the conveyor trailer 10 to support the conveyor rails 23, 25.

Figure 9:
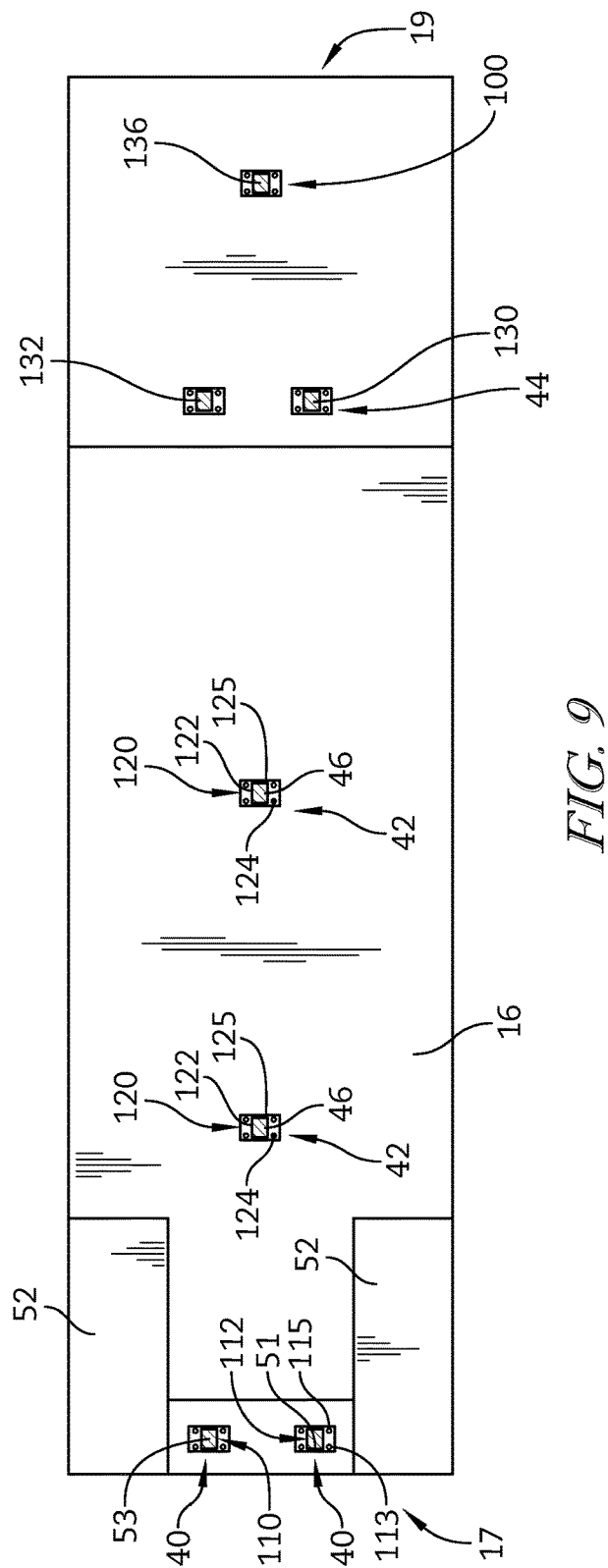
FIG. 9 is a cross-sectional view taken generally along the lines 9-9 of FIG. 6 and depicting a location of various legs of the conveyor system of FIG. 1.
Figure 13:
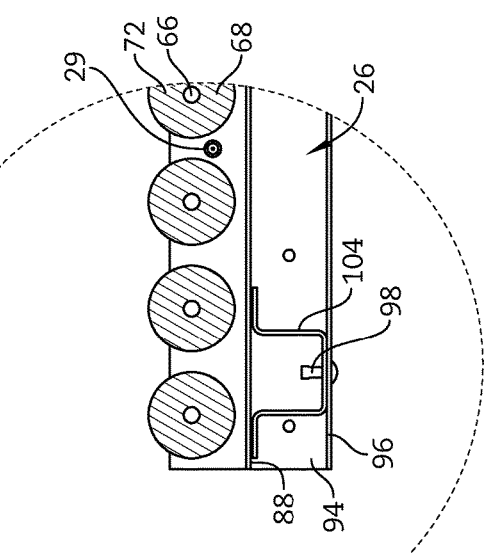
FIG. 13 is a detailed view of a portion of the conveyor system of FIG. 12.

The rear leg 40 is located at the rear 17 of the conveyor trailer 10 between the wheel wells 52, as shown in FIGS. 3, 6, and 9. The rear leg 40 includes a first leg tower 51, a second leg tower 53 located in spaced-apart relation to the first leg tower 51, a rear leg tower brace 102, and a channel support 104. The channel support 104 extends between and interconnects the first leg tower 51 and the second leg tower 53 of the rear leg 40 and is generally perpendicular to the first leg tower 51 and the second leg tower 53. The channel support 104 includes overhangs 106, 107 that are configured to be mount to the second segment 96 of the frame mount 26 with the fastener 98. In illustrative embodiments, the channel support 104 is U-shaped as shown in FIG. 13. In some embodiments, the channel support 104 is coupled to the first leg tower 51 and the second leg tower 53 of the rear leg 40 with a channel support mount bracket 109.

The rear leg tower brace 102 extends between and interconnects the first leg tower 51 and the second leg tower 53 of the rear leg 40, as shown in FIGS. 6 and 7. Illustratively, the rear leg tower brace 102 extends the entire width of the channel support 104, as shown in FIG. 3. The rear leg tower brace 102 can act as a protective web to add stability to the rear leg 40 and to protect the conveyor system 12 from an external force during loading or unloading of the conveyor trailer 10. The rear leg tower brace 102 can be formed to include apertures 108 that are configured to receive a fastener for coupling the rear leg tower brace 102 to the channel support 104 or the two towers 50, or both.

Figure 10:
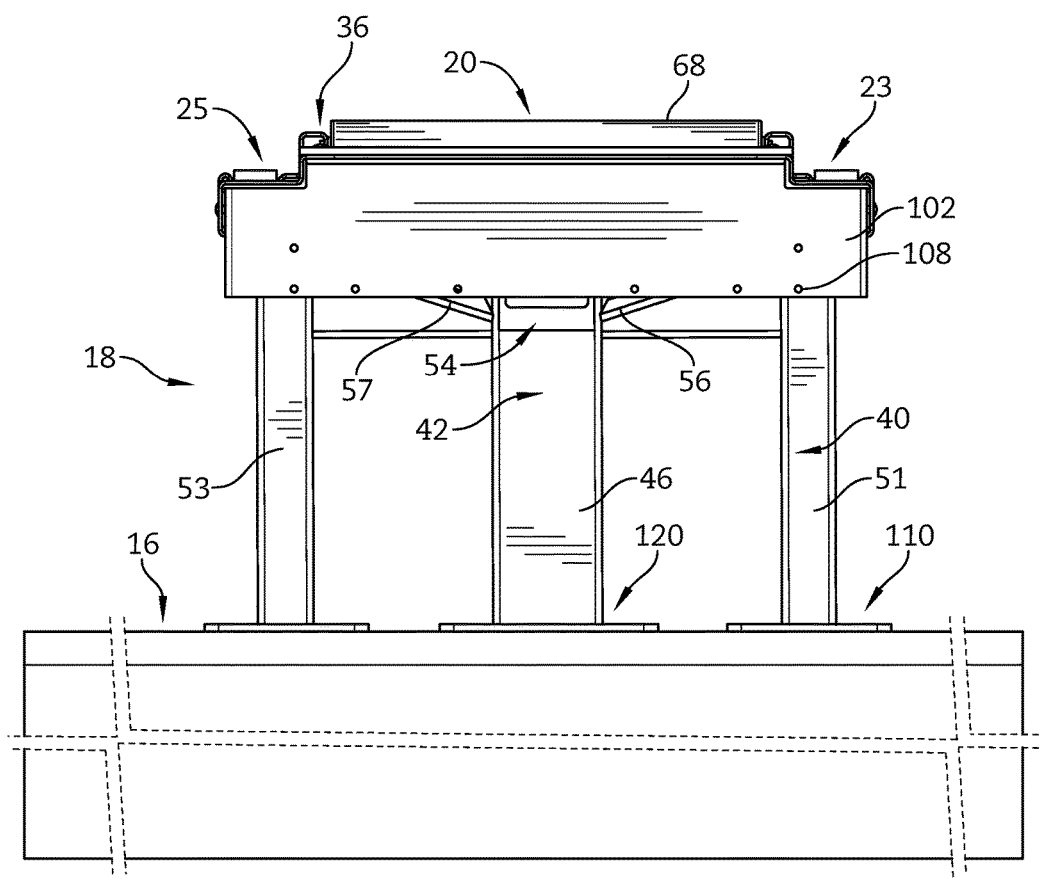
FIG. 10 is a front elevation view showing the rear leg and the belly leg of the conveyor system of FIG. 1.

The rear leg 40 is adapted to be coupled to the floor 16 of the conveyor trailer 10 with a floor bracket 110, as shown in FIGS. 3, 9, and 10. The floor bracket 110 includes a frame 112 formed to include an aperture 113 configured to receive the first leg tower 51 or the second leg tower 53, a flange 115, and an aperture 114 formed in the flange 115. The aperture 114 is configured to receive a fastener therethrough to couple the floor bracket 110 to the floor 16. In an embodiment, the frame 112 is generally square shaped so that aperture 113 is also generally square shaped. Illustratively, the floor bracket 110 includes four apertures 114 configured to fasten the floor bracket 110 to the floor 16.

In illustrative embodiments, the support frame 18 includes two belly legs 42, as shown in FIGS. 3 and 9. In other embodiments, the support frame 18 may include any suitable number of belly legs 42. The belly legs 42 are located in the belly 48 of the conveyor trailer 10 between the rear leg 40 and the upper coupler leg 44, as shown in FIGS. 3 and 9. The belly leg 42 includes a belly tower 46 to maximize the packing space on the floor 16 in the belly 48 of the conveyor trailer 10, as shown in FIG. 8, and a gusset bracket 54 to interconnect the conveyor rails 23, 25 to the support frame 18. The belly legs 42 are located along a longitudinal axis of the conveyor trailer 10 and each are located in about equal spaced-apart relation between the conveyor rails 23, 25.

The gusset bracket 54 of the belly leg 42 includes a first arm 56 and a second arm 57 that extend outwardly from the belly tower 46, and a channel support 58 to couple with the conveyor rails 23, 25, as shown in FIGS. 3 and 8. The channel support 58 is U-shaped and is similar in function to the channel support 104 of the rear leg 40. The channel support 58 extends between and interconnects the first arm 56 and the second arm 57 of the gusset bracket 54 and is generally perpendicular to the belly tower 46. The channel support 58 includes overhangs 116, 117 that are configured to be mounted to the second segment 96 of the frame mount 26 with the fastener 98. In an embodiment, the channel support 58 is coupled to the belly tower 46, the first arm 56, and the second arm 57. Illustratively, the channel support 58 is coupled to the belly tower 46 with a channel support mount bracket 119.

The belly leg 42 is adapted to be coupled to the floor 16 of the conveyor trailer 10 with a floor bracket 120, as shown in FIGS. 3, 8 and 9. The floor bracket 120 includes a frame 122 formed to include an aperture 123 configured to receive the base of the belly leg tower 46, a flange 125, and an aperture 124 formed in the flange 125. The aperture 124 is configured to receive a fastener therethrough to couple the floor bracket 120 to the floor 16. In an embodiment, the frame 122 is generally square shaped so that aperture 123 is also generally square shaped. Illustratively, the floor bracket 120 includes four apertures 124 configured to fasten the floor bracket 120 to the floor 16.

The gusset bracket 54 includes a first arm 56 and a second arm 57 that extend outwardly from the gusset bracket 54 to support the channel support 58 and to couple with the conveyor rails 23, 25, as shown in FIGS. 3 and 8. Each of the first arm 56 and the second arm 57 is cantilevered from the belly tower 46. The first arm 56 and second arm 57 are arranged to extend in opposite directions so that the first arm 56 couples to the first conveyor rail 23 and the second arm 57 couples to the second conveyor rail 25. Each of the first arm 56 and the second arm 57 include a distal end 126, 127 and a proximal end 128, 129. The proximal end 128 of the first arm 56 is coupled to the belly tower 46 and is arranged to extend horizontally away from the belly tower 46 towards the distal end 127 of the first arm 56. The distal end 127 of the first arm 56 is configured to couple with the first conveyor rail 23. The proximal end 129 of the second arm 57 is coupled to the belly tower 46 and is arranged to extend horizontally away from the belly tower 46 towards the distal end 127 of the second arm 57. The distal end 127 of the second arm 57 is configured to couple with the second conveyor rail 25. Illustratively, the first arm 56 and the second arm 57 are configured to support the channel support 58.

The upper coupler leg 44 is similar to the rear leg 40 and includes a first leg 130, a second leg 132, and a channel support 134, as shown in FIG. 3. As described for rear leg 40, the first leg 130 and the second leg 132 are configured to support the channel support 134 and the conveyor rails 23, 25. As described for the channel support 104, the channel support 134 is configured to mount within the frame mount 26 of the conveyor rails 23, 25.

The table leg 100 is similar to the belly leg 42 and includes a table tower 136, a first arm 138, and a second arm 140, as shown in FIG. 3. As described for the belly leg 42, the table tower 136 is arranged in about equal spaced-apart relation between the first conveyor rail 23 and the second conveyor rail 25. As described for the first arm 56 and the second arm 57, the first arm 138 and the second arm 140 extend outwardly in a cantilevered arrangement from the table tower 136. A channel support 142 is configured to couple with the table tower 136, the first arm 138, and the second arm 140 and span the distance between the first conveyor rail 23 and the second conveyor rail 25.

Figure 11:
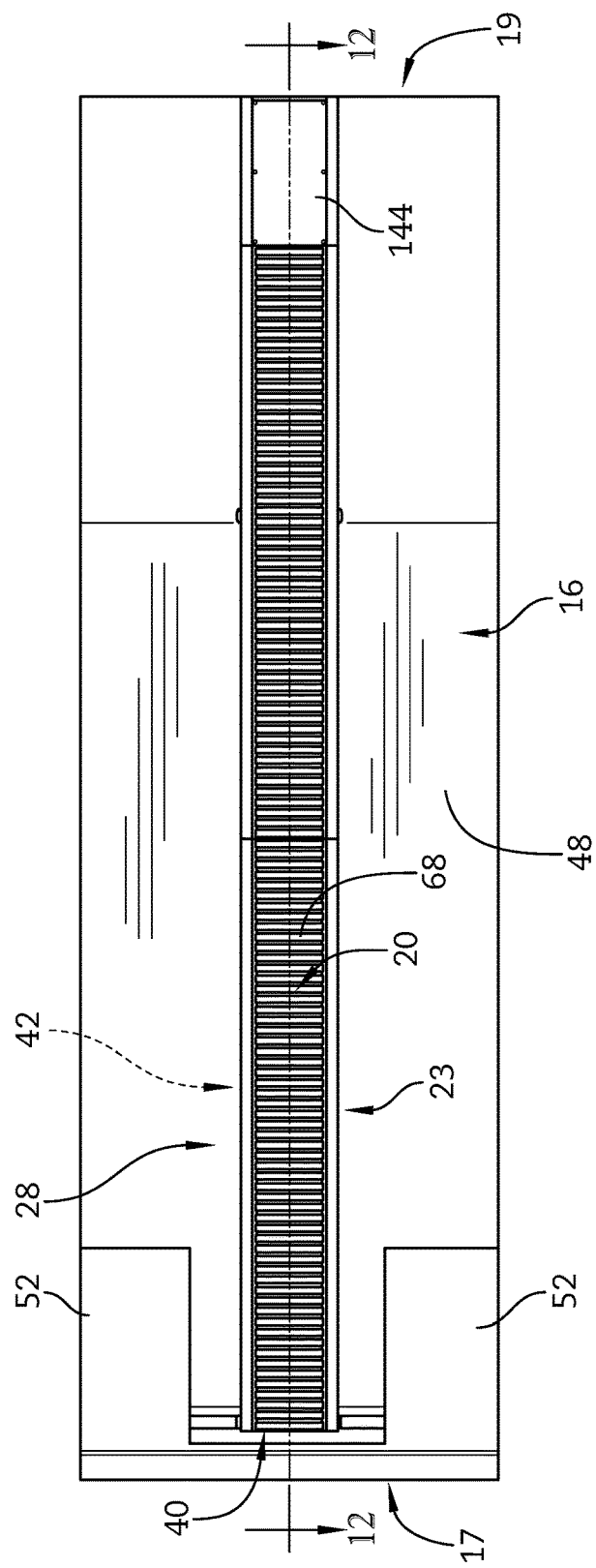
FIG. 11 is a top plan view of the conveyor system of FIG. 1 located within the cargo trailer.

The support frame 18 can further include a table 144 located at the front of the conveyor system 12, as shown in FIGS. 3 and 11. In illustrative embodiments, the table 144 is located above the table leg 100. Illustratively, the table 144 may be monolithic and arranged to extend between and interconnect to the first conveyor rail 23 and the second conveyor rail 25. The table 144 provides a solid surface along a portion of the conveyor system 12 so a user can safely traverse horizontally across the conveyor trailer 10 when the load deck panels 30 are in a horizontal orientation.

The set of rollers 20 includes a plurality of rollers 68 coupled between a first conveyor rail 23 and a second conveyor rail 25, as shown in FIGS. 3, 4, and 11. The plurality of rollers 68 cooperate to efficiently transport cargo within the trailer. In an embodiment the plurality of rollers 68 are comprised of 14 ga. steel. In another embodiment the plurality of rollers 68 are comprised of 16 ga. steel. In still another embodiment, the set of rollers 20 can include steel rollers 68 comprised of 14 ga. and steel rollers 68 comprised of 16 ga. steel. It is understood that while the plurality of rollers 68 are described herein as steel, any suitable metal, metal alloy, or polymeric composition can also be used.

Figure 14:
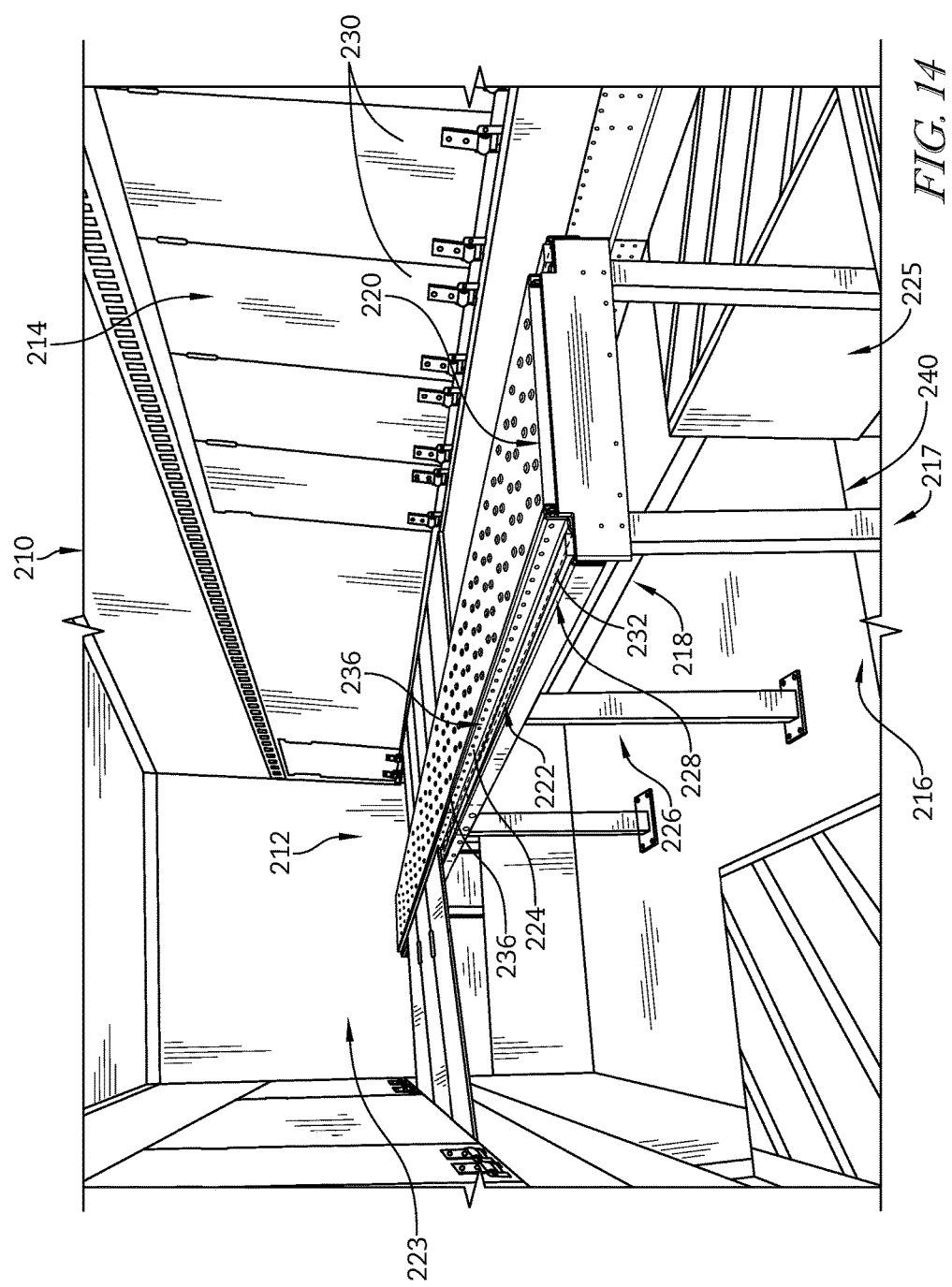
FIG. 14 is a perspective view of another embodiment of a conveyor system for loading a cargo trailer.

According to another aspect of the present disclosure, a conveyor trailer 210 can include the conveyor system 212, a load deck system 214, and a floor 216, as shown in FIG. 14. The support frame 218, the conveyor rail 222, and the load deck system 214 are similar in structure and function to the support frame 18, conveyor rail 22, and load deck system 14 of the conveyor system 12. The conveyor system 212 is mounted to the floor 216 and is used to load and unload the conveyor trailer 210.

The conveyor system 212 includes a support frame 218, a ball transfer assembly 220, and a conveyor rail 222, as shown in FIG. 14. The support frame 218 is adapted to couple the conveyor system 212 to the floor 216 of the conveyor trailer 210, and support the ball transfer assembly 220 and the conveyor rail 222. The ball transfer assembly 220 may improve the efficiency of transporting cargo from the rear 225 of the trailer towards the front 223 of the trailer so the cargo can be quickly secured. Illustratively, the cargo can be positioned on the load deck system 214. The conveyor rail 222 extends between and interconnects the ball transfer assembly 220 to the support frame 218, as shown in FIG. 14.

The conveyor rail 222 includes a ball transfer support 224, a frame mount 226, and a load deck support 228 that is arranged to extend between ball transfer support 224 and frame mount 226, as shown in FIG. 14. The frame mount 226 couples the conveyor rail 222 to the support frame 218. The load deck support 228 is configured to receive a bumper 232 and supports the load deck panels 230 when the load deck panels 230 are in the horizontal load position. The ball transfer support 224 couples the ball transfer assembly 220 to the conveyor rail 222 and includes a roller guard 236 that protects the ball transfer assembly 220 from an external force during loading or unloading of the conveyor trailer 210.

The conveyor systems 12, 212 are designed to move cargo in and out of a conveyor trailer 10, 210, sometimes referred to as a semi-trailer. At least one embodiment includes a top portion which includes the set of rollers 20 or ball transfer assembly 220, sometimes referred to as conveyance mechanisms (i.e. rollers, balls, frictionless materials, and/or any other suitable conveyance mechanisms), and a support frame 18, 218, sometimes referred to as a bottom portion, which is the support structure to the conveyor system 12, 212. The present invention may streamline the overall design (i.e. fewer parts, less footprint, etc.) and may provide greater overall cargo volume in the conveyor trailer 10, 210, sometimes referred to as trailer. It is possible that new conveyance mechanisms allow for multidirectional versus linear flow and are potentially more durable. The conveyor system 12, 212, sometimes referred to as the new design, may eliminate sharp edges and joints which can cause damage to cargo and/or workers. The reduced footprint of the conveyor system 12, 212, sometimes referred to as the new design, allows for better cargo handling/placement ergonomics. The multidirectional flow of the conveyance mechanism shown in FIG. 14 may allow cargo to be slid into place versus pick and place.

As noted above, the conveyor trailer 10 may include a load deck system 14 (or 214) attached to the walls 38 of the conveyor trailer 10. The load deck system 14 includes a plurality of load deck panels 30 hingedly attached to the walls 38. The load deck panels 30 may be vertically (or semi-vertically) oriented and may rotate to a horizontal or other angled position to support cargo in the conveyor trailer 10. When the load deck panels 30 are in their horizontal configuration, they extend inwardly from the walls 38 and rest on, for example, the bumper 92 of the load deck support 28 of the conveyor system 12. FIGS. 15-32 show various embodiments that utilize a position-assist element to selectively rotate one or more of the load deck panels 30. As seen in FIGS. 15-18, one embodiment of a position-assist element may include a spring hinge 300 that may be utilized to selectively rotate one or more of the load deck panels 30 between the horizontal (or loading) position and the vertical (or storage position). Optionally, the spring hinge 300 may be utilized to rotate the load deck panels 30 from any first position to any second position.

FIGS. 15-18 depict an illustrative embodiment of a system and method for rotating a load deck panel 30. The system includes a position-assist element in the form of at least one spring hinge 300 configured to be coupled to a load deck panel 30 and a wall 38 of the conveyor trailer 10. The spring hinge 300 generally includes a hinge strap portion 304, a hinge butt portion 308, and a torsion spring 312 that may provide hinged movement between the load deck panel 30 and the walls 38. Although a torsion spring 312 is described in detail in this embodiment and subsequent embodiments, it is to be appreciated that other springs may be used in these embodiments as well. Non-limiting examples of other springs include pneumatic springs, hydraulic springs, coil spring, leaf springs, etc. The hinge strap portion 304 may be pivotably coupled to the hinge butt portion 308 via a hinge pin 316 that provides a pivot axis 320. The hinge strap portion 304 includes a hinge plate 324 that extends away from the hinge butt portion 308 and is fixed to one of the load deck panels 30 using one or more fasteners 314 that may be coupled to the load deck panel 30 through one or more apertures (not shown) in the hinge plate 324. Illustratively, the hinge plate 324 may be rectangular in shape and may be rigidly connected to the load deck panel 30. Optionally, the hinge plate 324 may be formed in any suitable shape and/or may be connected to the load deck panel 30 in any suitable manner. The hinge strap portion 304 further includes a cylindrical member 328 coupled to or integral with an end of the hinge plate 324, wherein the cylindrical member 328 includes a channel 330 therethrough. The hinge pin 316 is received in the channel 330 of the cylindrical member 328 and bearings 332 may be positioned at both ends of the cylindrical member 328 between the cylindrical member 328 and vertically extending arms 340 of the hinge butt portion 308.

Referring again to FIGS. 15-18, the hinge butt portion 308 includes a central body 336 that is generally planar and the two vertically extending arms 340 that are coupled to opposing sides of the central body 336. A gap 344 may be formed between the two arms 340 and the central body 336. The gap 344 receives the cylindrical member 328 of the hinge strap portion 304 such that the channel 330 extending through the cylindrical member 328 aligns with apertures 348 in the arms 340. The apertures 348 in the arms 340 are positioned above the central body 336 and receive the hinge pin 316. In this manner, the hinge pin 316 extends through the aperture 348 in one of the arms 340, through a first of the bearings 332, through the cylindrical member 328, through the other of the bearings 332, and through the aperture 348 in the other arm 340.

The hinge butt portion 308 may be connected directly to the wall 38 of the conveyor trailer 10 or to a bracket 355 via one or more rivets 356 that extend through openings (not shown) in the central body 336, wherein the bracket 355 is attached in any suitable manner to the wall 38. It should be understood that other suitable fasteners, for example, mechanical fasteners, adhesives, welds, interference fits, snap fits, etc., may be utilized to couple the hinge butt portion 308 to the bracket 355 and/or any suitable mechanism for attachment of the hinge butt portion 308 to the wall 38 may be utilized. In illustrative embodiments, the wall 38 may include a rail (not shown) that creates an interference fit with the hinge butt portions 308 or the bracket 355. In some embodiments, the hinge butt portions 308 may be attached to the wall 38 in a manner that prevents vertical movement of the hinge butt portions 308, but allows for horizontal or lateral movement of the hinge butt portions 308 (for example, to slide the load deck panels 30 and spring hinges 300 along a length of the wall 38 (i.e., in and out of the conveyor trailer).

Figure 16:
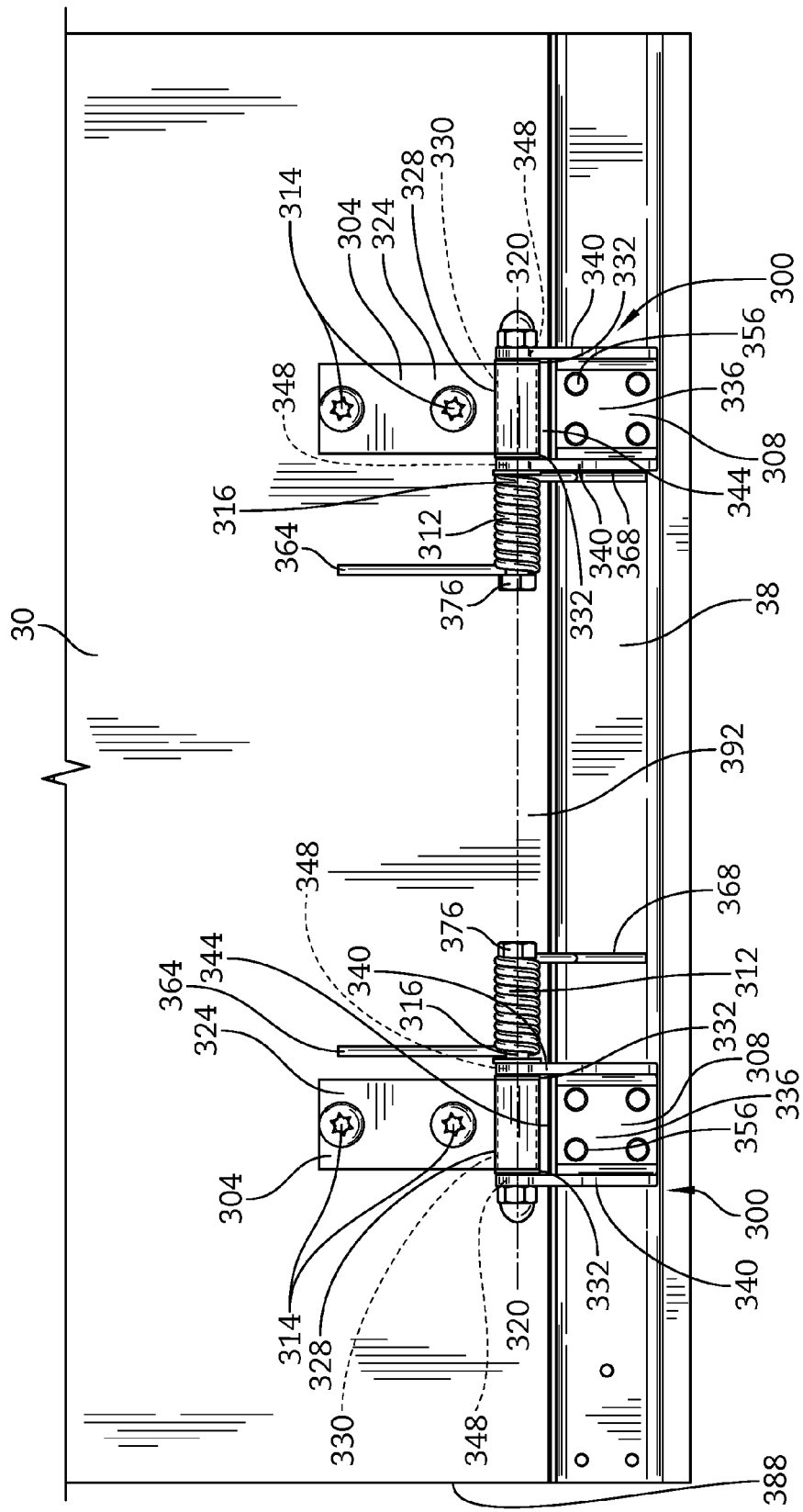
FIG. 16 is a front elevation view of the spring hinge of FIG. 15, wherein only a portion of a load deck panel is illustrated and the load deck panel is depicted in the closed configuration.
Figure 17:
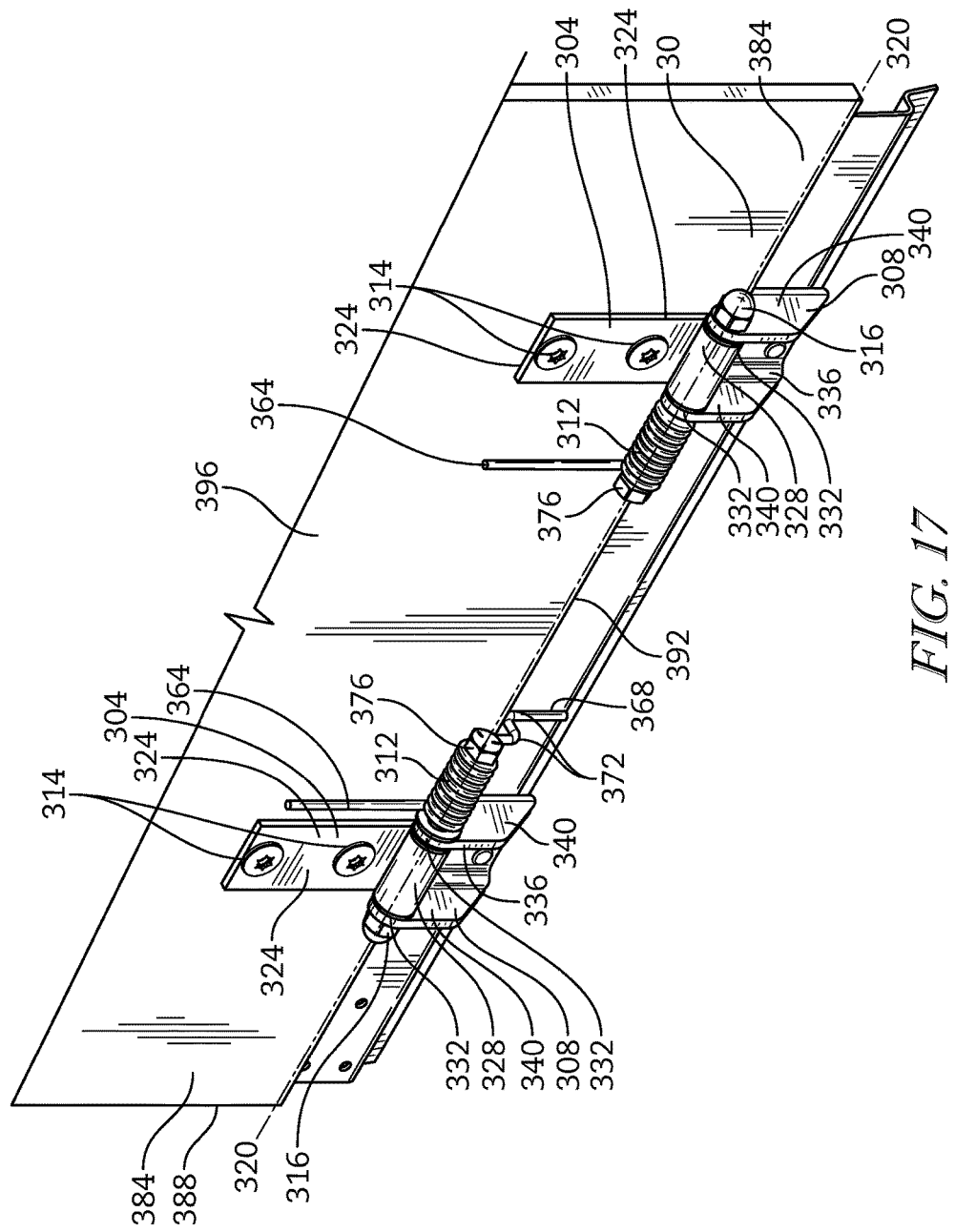
FIG. 17 is a top perspective view of the spring hinge of FIG. 15 with the load deck panel in the closed configuration.
Figure 18:
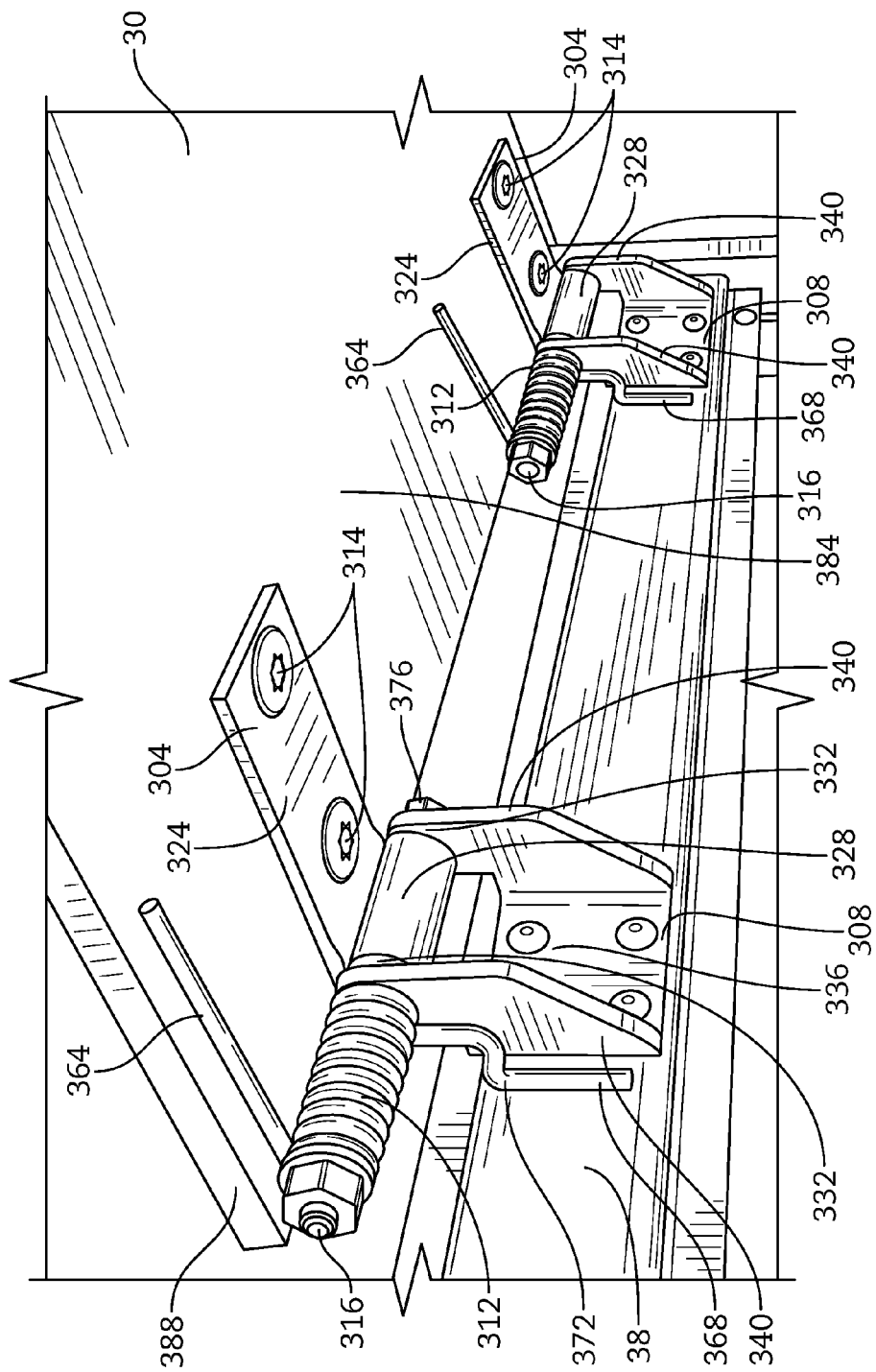
FIG. 18 is a bottom perspective view of the spring hinge of FIG. 15 with the load deck panel in an open configuration (i.e., horizontally oriented)

As seen in FIGS. 16, 17, and 18, the torsion spring 312 is wound around a portion of the hinge pin 316 outside of the gap 344. The torsion spring 312 has a first end 364 and a second end 368. The first end 364 of the torsion spring 312 extends away from the hinge pin 316 into contact the load deck panel 30 and the second end 368 extends away from the hinge pin 316 and makes two L-shaped turns 372 to extend along and into contact the bracket 355. The torsion spring 312 is held in place between an inner surface of an outward protrusion 376 on an end of the hinge pin 316 and one of the arms 340. While the torsion springs 312 are depicted as being inboard of the hinge strap portions 304 and the hinge butt portions 308, one or more of the torsion springs 312 may be located outboard of the hinge strap portions 304 and the hinge butt portions 308.

As again shown in FIGS. 16, 17, and 18, two hinge strap portions 304 are coupled to the load deck panel 30 with fasteners 314 through one or more apertures in the hinge plate 324. It is to be understood that, although two hinge strap portions 304 are shown as being coupled to each load deck panel 30, any suitable number of hinge strap portions 304 may be connected to each load deck panel 30. Illustratively, each load deck panel 30 includes a top surface 380, a bottom surface 384, first and second opposing side edges 388, an outer edge 392, and an inner edge 396. As shown in FIG. 16, each hinge plate 324 is connected to the bottom surface 384 near the outer edge 392 of the load deck panel 30.

Figure 15:
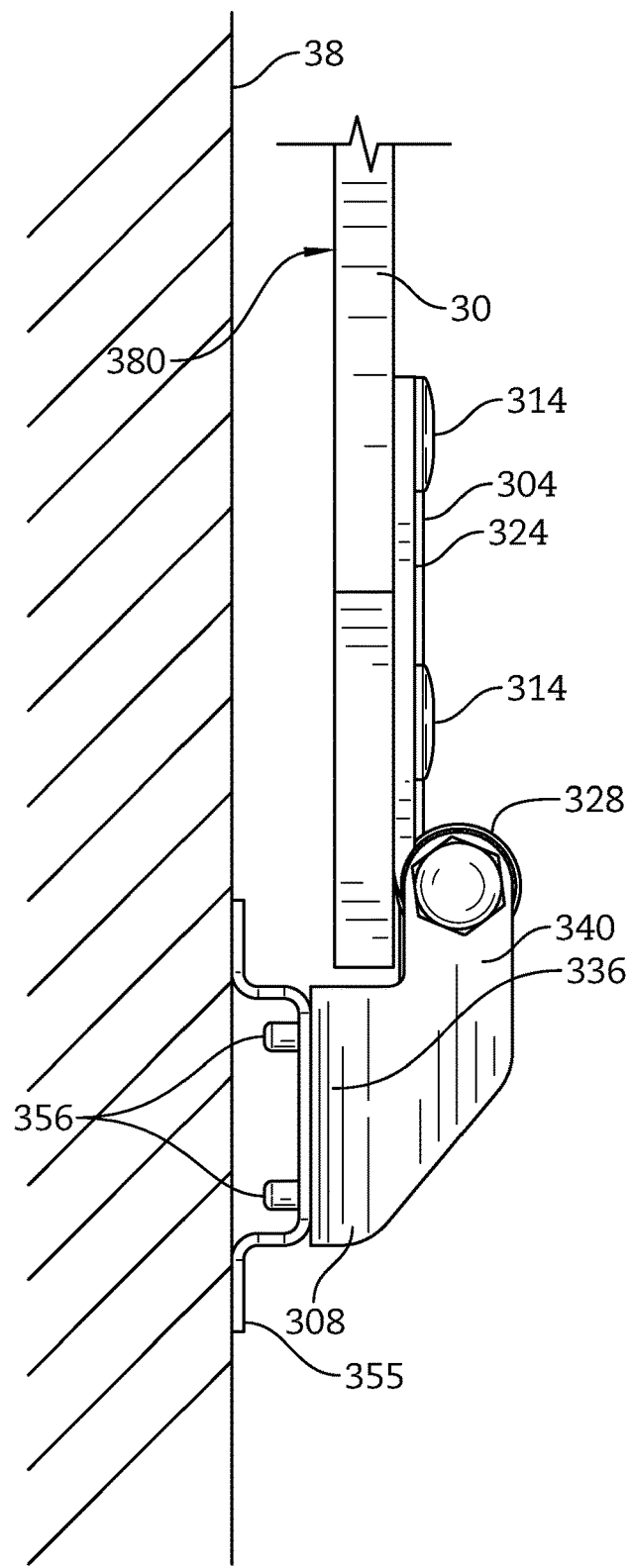
FIG. 15 is a side elevation view of an exemplary spring hinge for use in mounting one or more load deck panels utilized, for example, in any suitable trailer conveyor system, wherein the load deck panel is depicted in a closed configuration (i.e., oriented vertically)

As shown in FIGS. 15-17, the load deck panel 30 is held in the vertical position by contact between the first end 364 of the one or more torsion springs 312 and the bottom surface 384 of the load deck panel 30. A spring constant of the torsion spring 312 generates a torsional force that is translated into a linear force at the first end 364 of the torsion spring 312 against the load deck panel 30. Similarly, the spring constant generates a torsional force that is translated into a linear force at the second end 368 of the torsion spring 312 against the bracket 355. The torsional load within the torsion spring 312 and the spring constant of the torsion spring 312 translate the linear force at the first end 364 against the load deck panel 30 and at the second end 368 against the wall 38, which holds the load deck panel 30 vertically against the wall 38.

The spring hinge 300 and the spring constant of the torsion spring 312 selectively allow movement of the load deck panels 30 from the vertical (or storage position) to the horizontal (or loading) position when the torsional force of the torsion spring 312 is overcome. Overcoming the linear force against the load deck panel 30 allows for hinged movement of the load deck panel 30 about the pivot axis 320, pivoting the inner edge 396 towards an inside of the conveyor trailer 10. The load deck panel 30 can pivot about the pivot axis 320 until the load deck panel comes into contact with the conveyor rail 22, defining the horizontal position, as shown in FIG. 18. The spring constant of the torsion spring 312 is selected such that, the load deck panel 30 remains in the horizontal position until rotated into the vertical position by a user. In this manner, the spring hinge 300 provides a lift assist when hinged movement back to the vertical position is desired and allows for an improved mechanism for retaining load deck panels 30 in the vertical position.

Alternative embodiments featuring a position-assist element may be utilized to selectively rotate one or more of the load deck panels 30 between the horizontal (or loading) position and the vertical (or storage position). Optionally, alternative embodiments may be utilized to rotate the load deck panels 30 from any first position to any second position.

FIGS. 19-23 show an alternative system and method of rotating one or more load deck panels 30 utilizing a position-assist element forming a spring hinge system. The spring hinge system 401 may be utilized to selectively rotate one or more of the load deck panels 30 between the horizontal (or loading or open) position and the vertical (or storage or closed) position.

The spring hinge system 401 is configured to be coupled to a load deck panel 30 and a wall 38 of the conveyor trailer 10. The spring hinge 401 generally includes first and second spring hinges 400 (although any number of spring hinges 400 could be utilized) and a centrally positioned spring 412 that extends through an aperture or cutout 410 in the load deck panel 30 and couples to the load deck panel 30 and the wall 38 via tabs 411 and hooks 413 (although other coupling mechanism could be utilized). While the spring 412 is depicted as being centrally located, the spring 412 may be positioned at a location spaced from one or more spring hinges 400. The hooks 413 may be positioned on each end of the centrally positioned spring 412 and the tabs 411 may have openings configured to receive the hooks 413. One tab 411 may be positioned on the wall 38 and the other tab 411 may positioned on the load deck panel 30. The centrally positioned spring 412 may retain the load deck panel 30 in the horizontal and/or vertical positions and may further provide hinged movement between the load deck panel 30 and the walls 38.

Each of the spring hinges 400 may include a hinge strap portion 404 pivotably coupled to a hinge butt portion 408 via a hinge pin 416 (see FIGS. 22 and 23) that provides a pivot axis 420. The hinge strap portion 404 includes a hinge plate 424 that extends away from the hinge butt portion 408 and is fixed to one of the load deck panels 30 using one or more fasteners 414 that may be coupled to the load deck panel 30 through one or more apertures (not shown) in the hinge plate 424. Illustratively, the hinge plate 424 may be rectangular in shape and may be rigidly connected to the load deck panel 30. Optionally, the hinge plate 424 may be formed in any suitable shape and/or may be connected to the load deck panel 30 in any suitable manner. The hinge strap portion 404 further includes a cylindrical member 428 coupled to or integral with an end of the hinge plate 424, wherein the cylindrical member 428 includes a channel 430 therethrough. The hinge pin 416 is received in the channel 430 of the cylindrical member 428 and bearings 432 may be positioned at both ends of the cylindrical member 428 between the cylindrical member 428 and vertically extending arms 440 of the hinge butt portion 408.

Referring again to FIGS. 19-23, the hinge butt portion 408 includes a central body 436 that is generally planar. The two vertically extending arms 440 are coupled to opposing sides of the central body 436. A gap 444 may be formed between the two arms 440 and the central body 436. The gap 444 receives the cylindrical member 428 of the hinge strap portion 404 such that the channel 430 extending through the cylindrical member 428 aligns with apertures 448 in the arms 440. The apertures 448 in the arms 440 are positioned above the central body 436 and receive the hinge pin 416. In this manner, the hinge pin 416 extends through the aperture 448 in one of the arms 440, through a first of the bearings 432, through the cylindrical member 428, through the other of the bearings 432, and through the aperture 448 in the other arm 440.

The hinge butt portion 408 may be connected directly to the wall 38 of the conveyor trailer 10 or to a bracket 455 via one or more rivets 456 that extend through openings (not shown) in the central body 436, wherein the bracket 455 is attached in any suitable manner to the wall 38. It should be understood that other suitable fasteners, for example, mechanical fasteners, adhesives, welds, interference fits, snap fits, etc., may be utilized to couple the hinge butt portion 408 to the bracket 455 and/or any suitable mechanism for attachment of the hinge butt portion 408 to the wall 38 may be utilized. In illustrative embodiments, the wall 38 may include a rail (not shown) that creates an interference fit with the hinge butt portions 408 or the bracket 455. In some embodiments, the hinge butt portions 408 may be attached to the wall 38 in a manner that prevents vertical movement of the hinge butt portions 408, but allows for horizontal or lateral movement of the hinge butt portions 408 (for example, to slide the load deck panels 30 and spring hinges 400 along a length of the wall 38 (i.e., in and out of the conveyor trailer).

Figure 19:
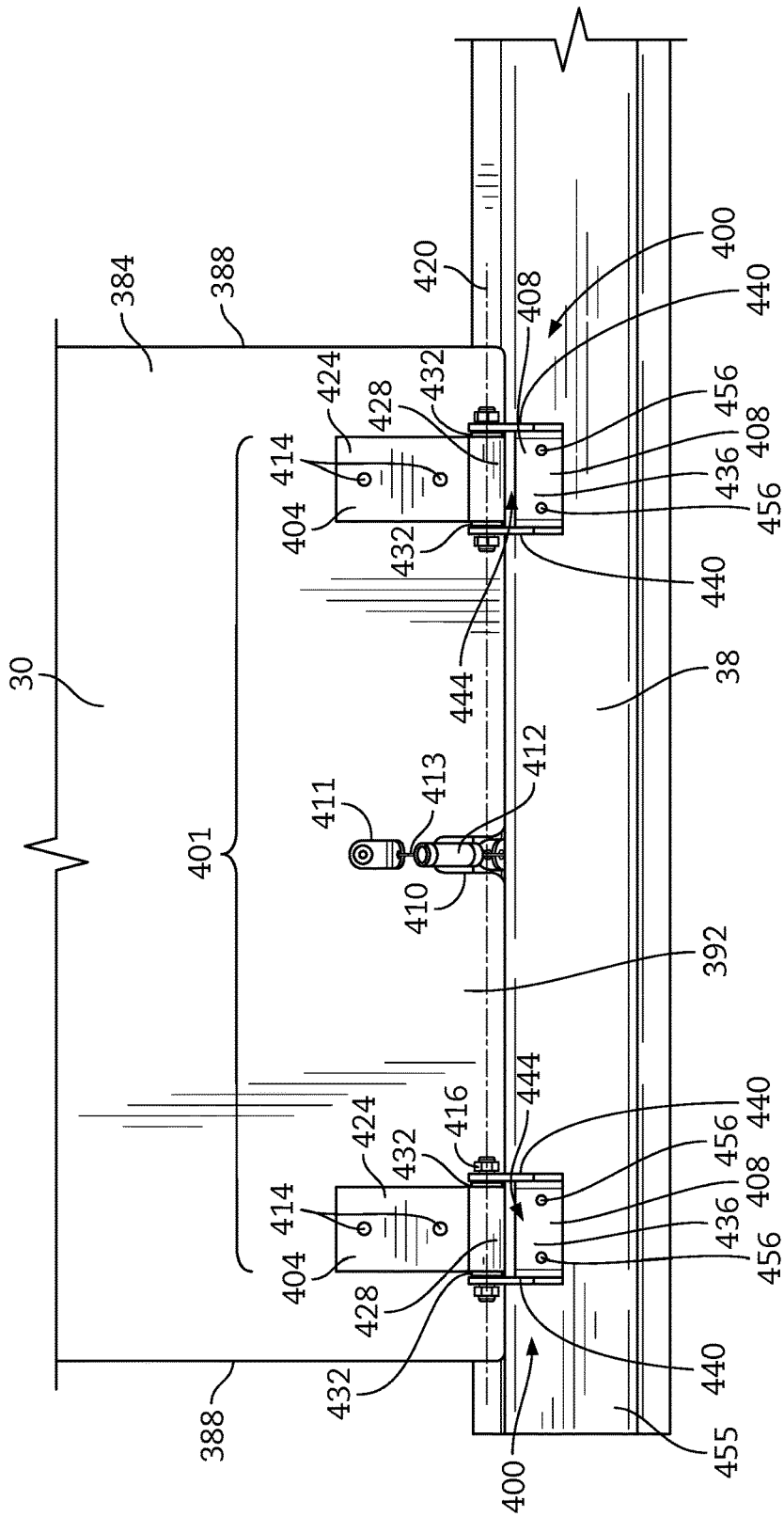
FIG. 19 is a front elevation view of a further exemplary spring hinge for use in mounting one or more load deck panels utilized, for example, in a suitable trailer conveyor system, wherein the load deck panel is depicted in a closed configuration (i.e., oriented vertically)
Figure 20:
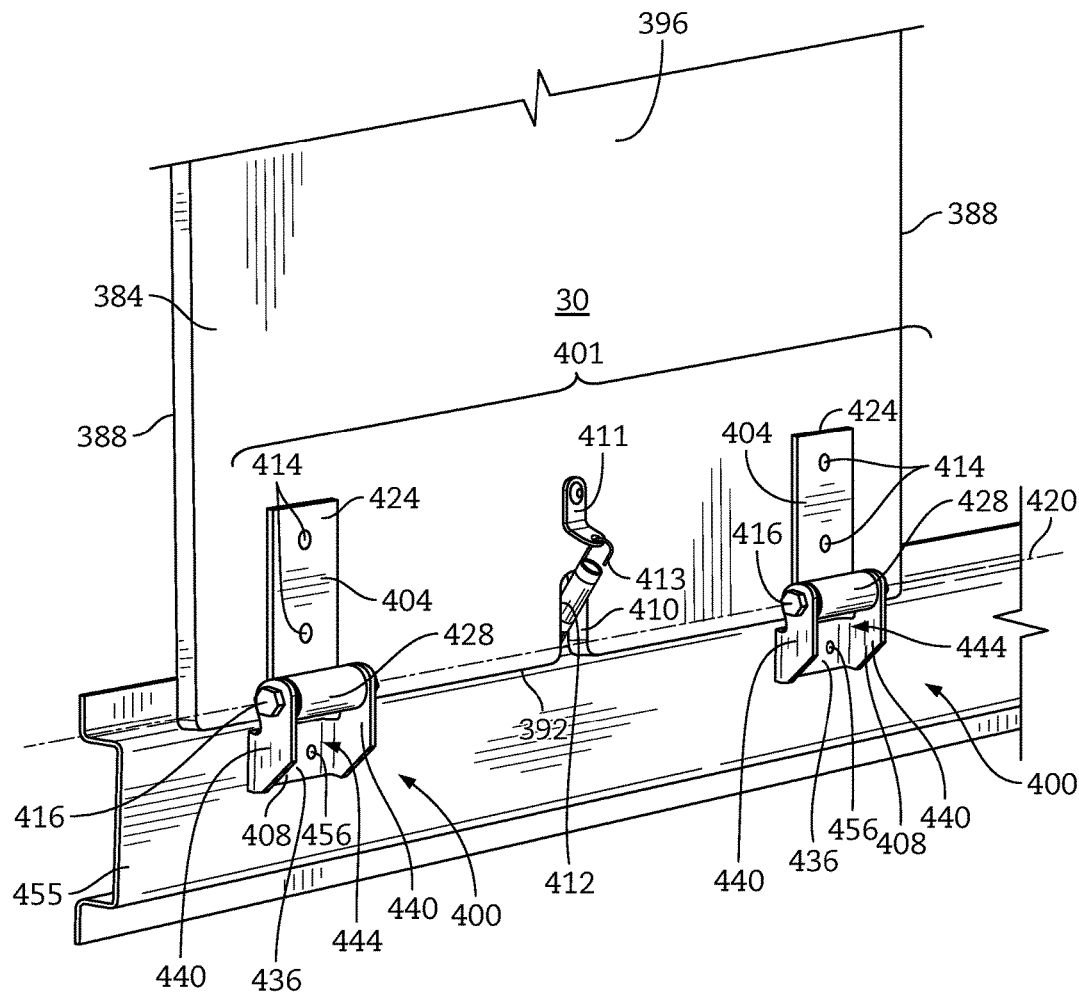
FIG. 20 is a top perspective view of the spring hinge of FIG. 19 with the load deck panel in the closed configuration.
Figure 21:
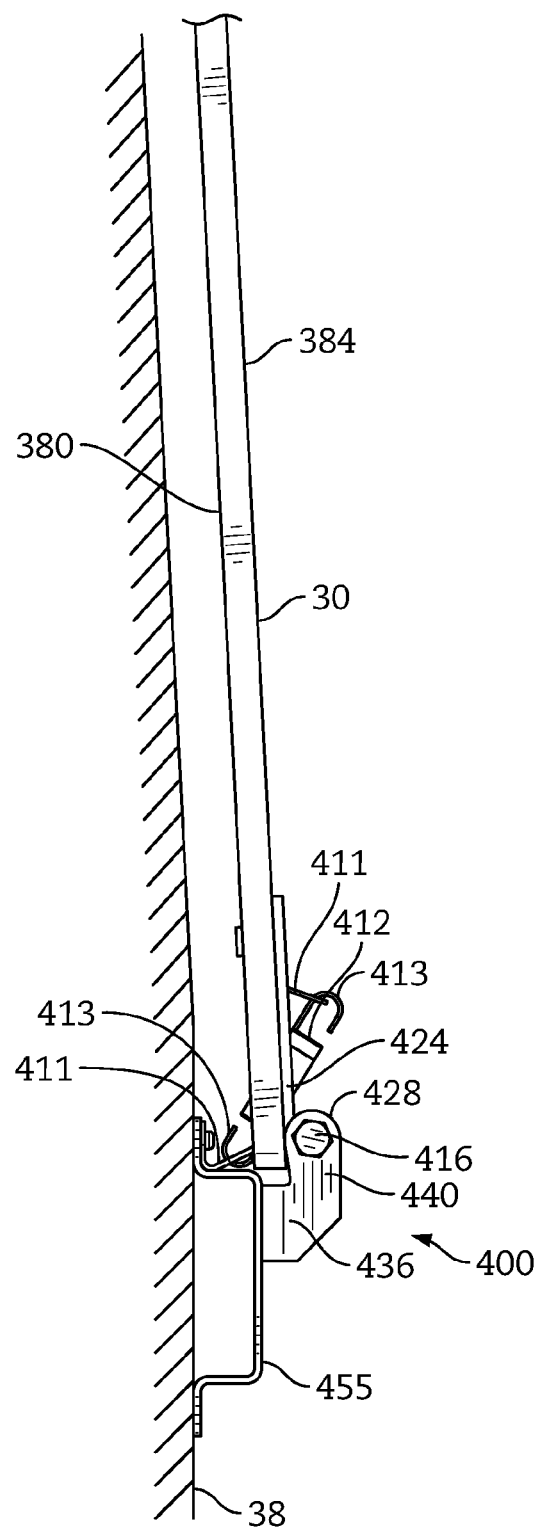
FIG. 21 is a side elevation view of the spring hinge of FIG. 19 with the load deck panel in the closed configuration.
Figure 22:
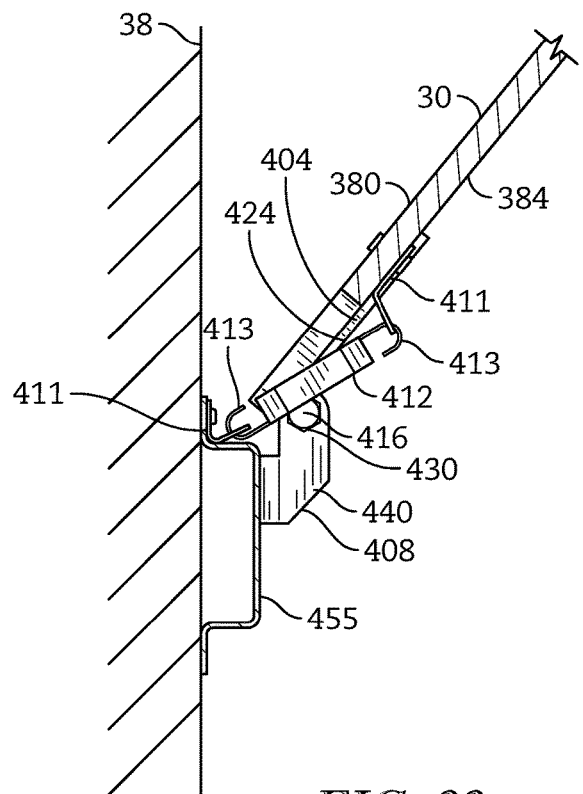
FIG. 22 is a side elevation, partial cross-section view of the spring hinge of FIG. 19 in a partially closed configuration (between the closed and an open configuration)

As again shown in FIGS. 19, 20, and 21, two spring hinges 400 are coupled to the load deck panel 30 with fasteners 414 extending through one or more apertures in the hinge plate 424. It is to be understood that, although two spring hinges 400 are shown as being coupled to each load deck panel 30, any suitable number of spring hinges 400 may be connected to each load deck panel 30. Illustratively, each load deck panel 30 includes a top surface 380, a bottom surface 384, first and second opposing side edges 388, an outer edge 392, and an inner edge 396. As shown in FIG. 21, each hinge plate 424 is connected to the bottom surface 384 near the outer edge 392 of the load deck panel 30.

Figure 23:
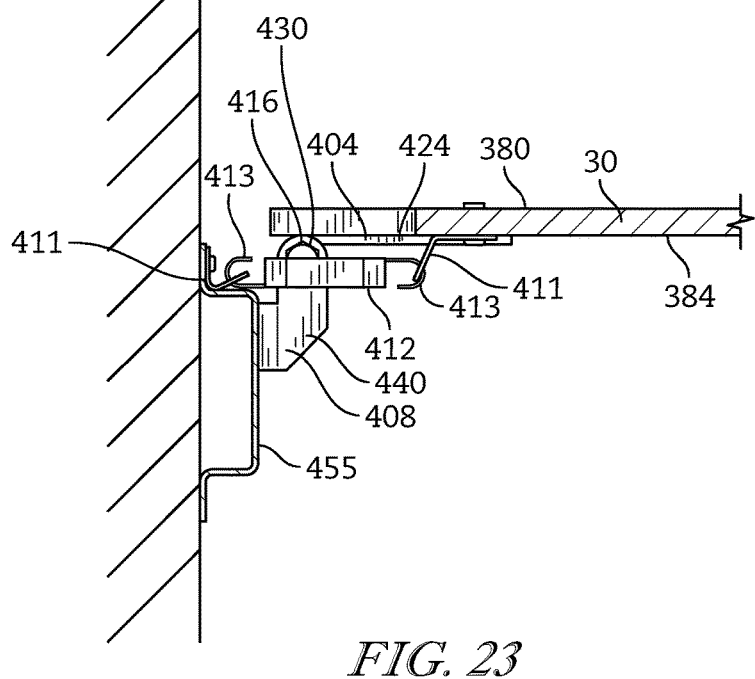
FIG. 23 is a side elevation, partial cross-section view of the spring hinge of FIG. 19 in the open configuration n (i.e., oriented horizontally)
Figure 24:
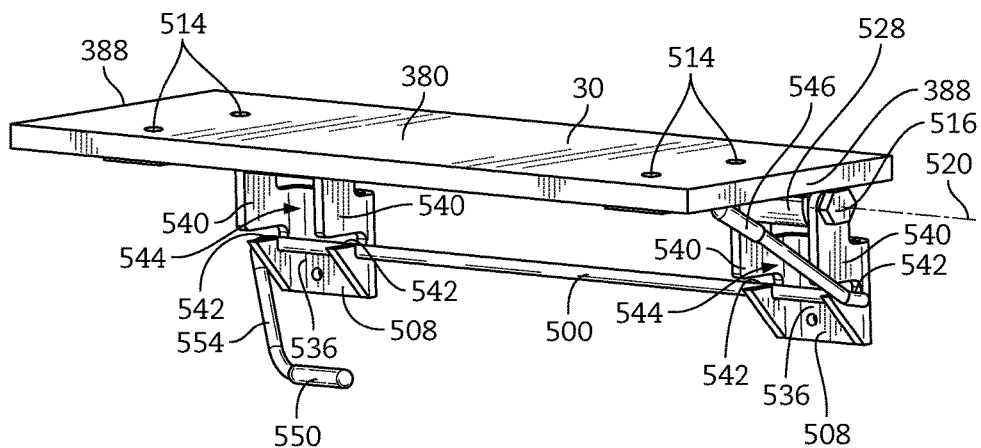
FIG. 24 is top perspective view of still another exemplary spring hinge for use in mounting one or more load deck panels utilized, for example, in a suitable trailer conveyor system, wherein the load deck panel is depicted in an open configuration (i.e., oriented horizontally)

As seen in FIGS. 19-23 the spring 412 may be oriented at an angle when holding the deck panel 30 in the vertical position. A spring constant of the spring 412 generates tension in the spring 412 which pulls against the tabs 413 via the hooks 411, thereby providing a force to hold the deck panel 30 in the vertical position against the wall 38. The spring hinge 400 and the spring constant of the spring 412 selectively allow movement of the load deck panels 30 from the vertical (or storage position) to the horizontal (or loading) position when the force of the torsion spring 412 is overcome. Overcoming the force holding the load deck panel 30 vertically allows for hinged movement of the load deck panel 30 about the pivot axis 420, pivoting the inner edge 396 towards an inside of the conveyor trailer 10. The load deck panel 30 can pivot about the pivot axis 420 until the load deck panel comes into contact with the conveyor rail 22, defining the horizontal position, as shown in FIG. 23. The spring 412 expands from a contracted position to an extended position when moving from the vertical to the horizontal position. The spring constant of the spring 412 is selected such that, the load deck panel 30 remains in the horizontal position until rotated into the vertical position by a user. In this manner, the spring hinge 400 provides a lift assist when hinged movement back to the vertical position is desired and allows for an improved mechanism for retaining load deck panels 30 in the vertical position.

FIGS. 24-27 show an alternative system and method for selectively rotating a load deck panel 30 between the horizontal (or loading or open) position and the vertical (or storage or closed) position, the system comprising a position-assist element in the form of a torsion bar 500.

The torsion bar 500 may be configured to interface with the load deck panel 30 and the wall 38 of the conveyor trailer 10. The system may generally include a hinge strap portion 504 that may be pivotably coupled to a hinge butt portion 508 via a hinge pin 516 (shown in FIG. 24) that provides a pivot axis 520. The hinge strap portion 504 includes a hinge plate 524 that extends away from the hinge butt portion 508 and is fixed to one of the load deck panels 30 using one or more fasteners 514 that may be coupled to the load deck panel 30 through one or more apertures (not shown) in the hinge plate 524 (and/or the load deck panel 30). Illustratively, the hinge plate 524 may be rectangular in shape and may be rigidly connected to the load deck panel 30. Optionally, the hinge plate 524 may be formed in any suitable shape and/or may be connected to the load deck panel 30 in any suitable manner. The hinge strap portion 504 further includes a cylindrical member 528 coupled to or integral with an end of the hinge plate 524, wherein the cylindrical member 528 includes a channel (not shown) therethrough. The hinge pin 516 is received in the channel of the cylindrical member 528 and bearings (not shown) may be positioned at both ends of the cylindrical member 528 between the cylindrical member 528 and vertically extending arms 540 of the hinge butt portion 508, in a manner similar to previous embodiments.

Two hinge strap portions 504 may be coupled to the load deck panel 30 with fasteners 514 through one or more apertures in the hinge plate 524 with two corresponding hinge butt portions 508 and hinge pins 516. It is to be understood that, although two hinge strap portions 504 are shown as being coupled to each load deck panel 30, any suitable number of hinge strap portions 504 may be connected to each load deck panel 30. Illustratively, each load deck panel 30 includes a top surface 380, a bottom surface 384, first and second opposing side edges 388, an outer edge 392, and an inner edge 396. As shown in FIG. 21, each hinge plate 424 is connected to the bottom surface 384 near the outer edge 392 of the load deck panel 30.

Referring again to FIGS. 24-27, the hinge butt portion 508 includes a central body 536 that is generally planar and the two vertically extending arms 540 that are coupled to opposing sides of the central body 536. A gap 544 may be formed between the two arms 540 and the central body 536. The gap 544 receives the cylindrical member 528 of the hinge strap portion 504 such that the channel 530 extending through the cylindrical member 528 aligns with apertures 548 in the arms 540. The apertures 548 in the arms 540 are positioned above the central body 536 and receive the hinge pin 516. In this manner, the hinge pin 516 extends through the aperture 548 in one of the arms 540, through a first of the bearings 532, through the cylindrical member 528, through the other of the bearings 532, and through the aperture 548 in the other arm 540. Each of the two arms 540 may include an L-shaped slot 542 that may receive and retain a portion of the torsion bar 500 within the two arms 540. The torsion bar 500 may be received in the L-shaped slots 542 of the two arms 540 and may extend between the two hinge butt portions 508. A first end 546 and a second end 550 of the torsion bar 500 may have a U-shape 554 that allows the first end 546 to interface with the bottom surface 384 of the load deck panel 30 and the second end 550 to interface with the wall 38. In some embodiments, the U-shape 554 of the first end 546 and second end 550 provides a preload to the torsion bar 500.

The hinge butt portion 508 may be connected directly to the wall 38 of the conveyor trailer 10 or to a bracket 555 via one or more rivets (not shown) that extend through openings (not shown) in the central body 536, wherein the bracket 555 is attached in any suitable manner to the wall 38. It should be understood that other suitable fasteners, for example, mechanical fasteners, adhesives, welds, interference fits, snap fits, etc., may be utilized to couple the hinge butt portion 508 to the bracket 555 and/or any suitable mechanism for attachment of the hinge butt portion 508 to the wall 38 may be utilized. In illustrative embodiments, the wall 38 may include a rail (not shown) that creates an interference fit with the hinge butt portions 508 or the bracket 555. In some embodiments, the hinge butt portions 508 may be attached to the wall 38 in a manner that prevents vertical movement of the hinge butt portions 508, but allows for horizontal or lateral movement of the hinge butt portions 508 (for example, to slide the load deck panels 30 and spring hinge 500 along a length of the wall 38 (i.e., in and out of the conveyor trailer).

The load deck panel 30 is held in the vertical position by contact between the first end 546 of the torsion bar 500 and the bottom surface 384 of the load deck panel 30. The torsion bar 500 may be supplied with a preloaded torsional force that is translated into a linear force at the first end 546 of the torsion bar 500 against the load deck panel 30. Similarly, the preloaded torsional force is translated into a linear force at the second end 550 of the torsion bar 500 against the wall 38. These preloaded torsional loads hold the load deck panel 30 vertically against the wall 38.

Figure 25:
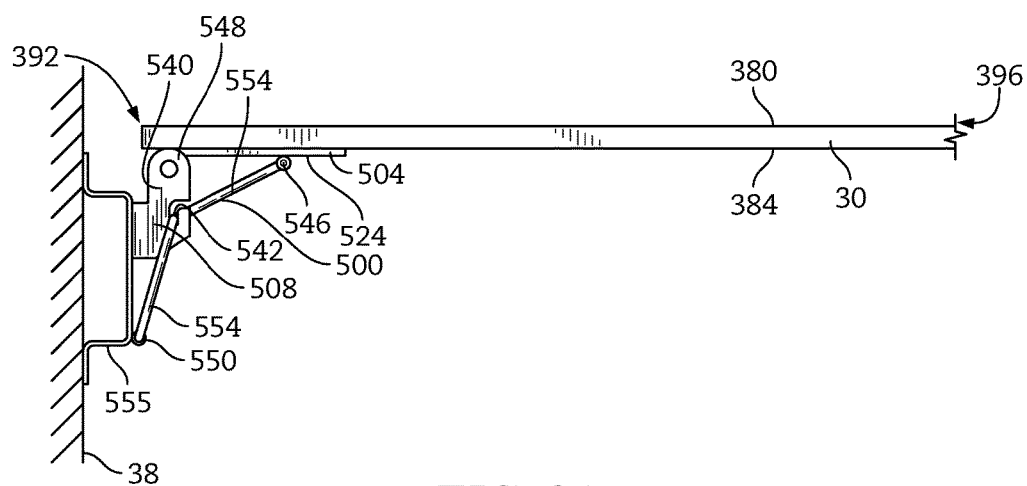
FIG. 25 is a side elevation view of the spring hinge of FIG. 24 in the open configuration.
Figure 26:
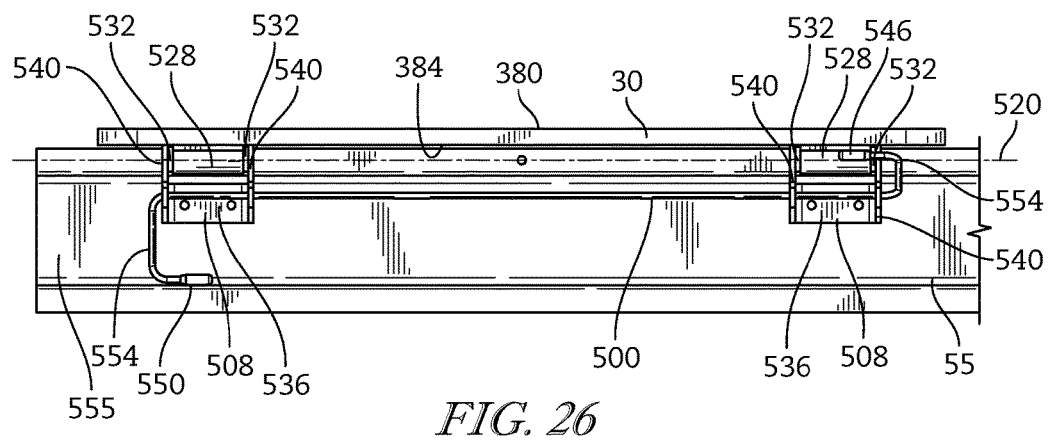
FIG. 26 is a front elevation view of the spring hinge of FIG. 24 in the open configuration.
Figure 27:
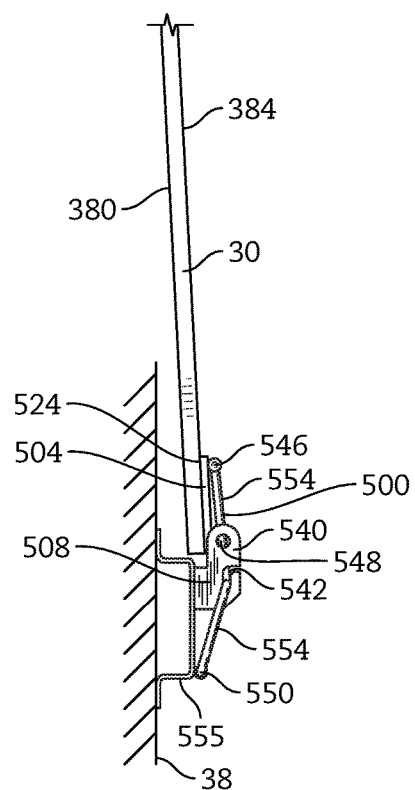
FIG. 27 is a side elevation view of the spring hinge of FIG. 24 in a closed configuration (i.e., oriented vertically)

The torsion bar 500 may be selectively actuated to move the load deck panel 30 from the vertical (or storage position) to the horizontal (or loading) position by overcoming the preloaded torsional force. Overcoming the linear force against the load deck panel 30 allows for hinged movement of the load deck panel 30 about the pivot axis 520, pivoting the inner edge 396 towards an inside of the conveyor trailer 10. The load deck panel 30 can pivot about the pivot axis 520 until the load deck panel comes into contact with the conveyor rail 22, defining the horizontal position, as shown in FIG. 25. The preloaded torsional force of the torsion bar 500 is selected such that the load deck panel 30 remains in the horizontal position until rotated into the vertical position by a user. In this manner, the torsion bar 500 provides a lift assist when hinged movement back to the vertical position is desired and allows for an improved mechanism for retaining load deck panels 30 in the vertical position.

FIGS. 28-32 depict yet another embodiment system and method for selectively rotating a load deck panel 30 between the horizontal (or loading or open) position and the vertical (or storage or closed) position, the system including a position-assist element in the form of at least one spring hinge 600 configured to be coupled to a load deck panel 30 and a wall 38 of the conveyor trailer 10. The spring hinge 600 generally includes a hinge strap portion 604, a hinge butt portion 608, and a torsion spring 612 that may provide hinged movement between the load deck panel 30 and the walls 38. The hinge strap portion 604 may be pivotably coupled to the hinge butt portion 608 via a first hinge pin 616 that provides a pivot axis 620. The hinge strap portion 604 includes a hinge plate 624 that extends away from the hinge butt portion 608 and is fixed to one of the load deck panels 30 using one or more fasteners 614 that may be coupled to the load deck panel 30 through one or more apertures (not shown) in the hinge plate 624 (and/or the load deck panels 30). Illustratively, the hinge plate 624 may be rectangular in shape having a thickened end 626 and a curved ledge 622 connecting the raised end 626 and the hinge plate 624. While the hinge plate 624 and the thickened end 626 are shown as being integral, the hinge plate 624 and the thickened end 626 may alternatively be formed of two separate pieces (either adjacent one another or spaced from one another).

The hinge plate 624 may be rigidly connected to the load deck panel 30. Optionally, the hinge plate 624 may be formed in any suitable shape and/or may be connected to the load deck panel 30 in any suitable manner. The hinge strap portion 604 further includes a cylindrical member 628 coupled to or integral with an end of the hinge plate 624. The cylindrical member 628 includes a channel 630 therethrough that receives a first hinge pin 616 that is received in the channel 630 of the cylindrical member 628, and bearings 632 may be positioned at both ends of the cylindrical member 628 between the cylindrical member 628 and vertically extending arms 640 of the hinge butt portion 608.

The hinge butt portion 608 includes a central body 636 (shown in FIGS. 30 and 31) that is generally planar. The two vertically extending arms 640 are coupled to opposing sides of the central body 636. A gap 644 may be formed between the two arms 640 and the central body 636. The gap 644 receives the cylindrical member 628 of the hinge strap portion 604 such that the channel 630 extending through the cylindrical member 628 aligns with apertures 648 in the arms 640. The apertures 648 in the arms 640 are positioned above the central body 636 and receive the first hinge pin 616. In this manner, the hinge pin 616 extends through the aperture 648 in one of the arms 640, through a first of the bearings 632, through the cylindrical member 628, through the other of the bearings 632, and through the aperture 648 in the other arm 640. The vertically extending arms 640 of the hinge butt portion 608 may include secondary apertures 650 that are configured to receive a second hinge pin 652. The second hinge pin 652 may extend between the two vertically extending arms 640. In this manner, the second hinge pin 652 is received in the aperture 650 in one of the arms 640 and received in the aperture 650 in the other arm 640.

The hinge butt portion 608 may be connected directly to the wall 38 of the conveyor trailer 10 or to a bracket 655 via one or more rivets (not shown) that extend through openings (not shown) in the central body 636, wherein the bracket 655 is attached in any suitable manner to the wall 38. It should be understood that other suitable fasteners, for example, mechanical fasteners, adhesives, welds, interference fits, snap fits, etc., may be utilized to couple the hinge butt portion 608 to the bracket 655 and/or any suitable mechanism for attachment of the hinge butt portion 608 to the wall 38 may be utilized. In illustrative embodiments, the wall 38 may include a rail (not shown) that creates an interference fit with the hinge butt portions 608 or the bracket 655. In some embodiments, the hinge butt portions 608 may be attached to the wall 38 in a manner that prevents vertical movement of the hinge butt portions 608, but allows for horizontal or lateral movement of the hinge butt portions 608 (for example, to slide the load deck panels 30 and spring hinges 600 along a length of the wall 38 (i.e., in and out of the conveyor trailer).

The torsion spring 612 is wound around a portion of the second hinge pin 652 between the two vertically extending arms 640. The torsion spring 612 has a first end 664 and a second end 668. The first end 664 of the torsion spring 612 extends away from the second hinge pin 616 into contact the wall 38 (or the bracket 655 or other suitable surface) and the second end 668 extends away from the hinge pin 616 and makes an angled turn 672 to extend along and into contact the hinge plate 624 and/or the raised end 626 and curved ledge 622.

Two hinge strap portions 604 are coupled to the load deck panel 30 with fasteners 614 through one or more apertures in the hinge plate 624. It is to be understood that, although two hinge strap portions 604 (and corresponding hinge butt portions 608, etc.) are shown as being coupled to each load deck panel 30, any suitable number of hinge strap portions 604 may be connected to each load deck panel 30. Illustratively, each load deck panel 30 includes a top surface 380, a bottom surface 384, first and second opposing side edges 388, an outer edge 392, and an inner edge 396. Each hinge plate 324 is connected to the bottom surface 384 near the outer edge 392 of the load deck panel 30.

The load deck panel 30 is held in the vertical position by contact between the first end 664 of the one or more torsion springs 612 and the wall 38 or the bracket 655 (or other surface) and contact between the second end 668 of the one or more torsion springs 612 and the curved ledge 622 of the hinge plate 624. A spring constant of the torsion spring 612 generates a torsional force that is translated into a linear force at the first end 664 of the torsion spring 612 against the wall 38, the bracket 655, or other surface. Similarly, the spring constant generates a torsional force that is translated into a linear force at the second end 668 of the torsion spring 612 against curved ledge 622. The torsional load within the torsion spring 612 and the spring constant of the torsion spring 612 translate the linear force at the first end 664 against the wall 38, the bracket 655, or other surface and at the second end 668 against the curved ledge 622, which holds the load deck panel 30 vertically against the wall 38.

Figure 28:
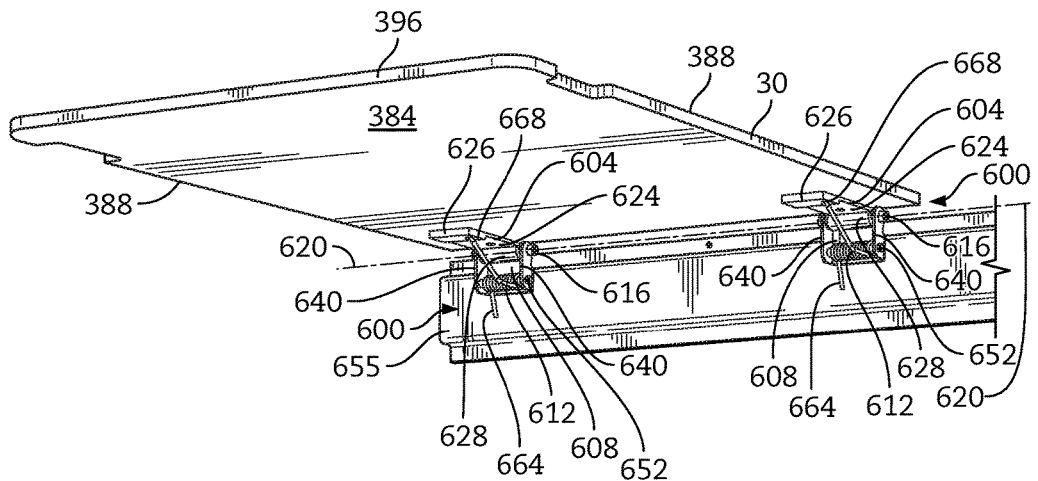
FIG. 28 is a bottom perspective view of yet another exemplary spring hinge for use in mounting one or more load deck panels utilized, for example, in a suitable trailer conveyor system, wherein the load deck panel is depicted in an open configuration (i.e., oriented horizontally)
Figure 29:
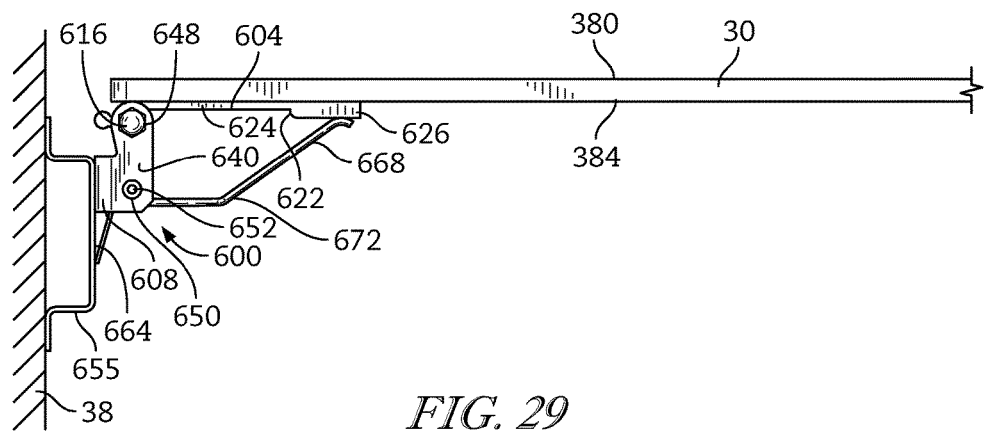
FIG. 29 is a side elevation view of the spring hinge of FIG. 28 in the open configuration.
Figure 30:
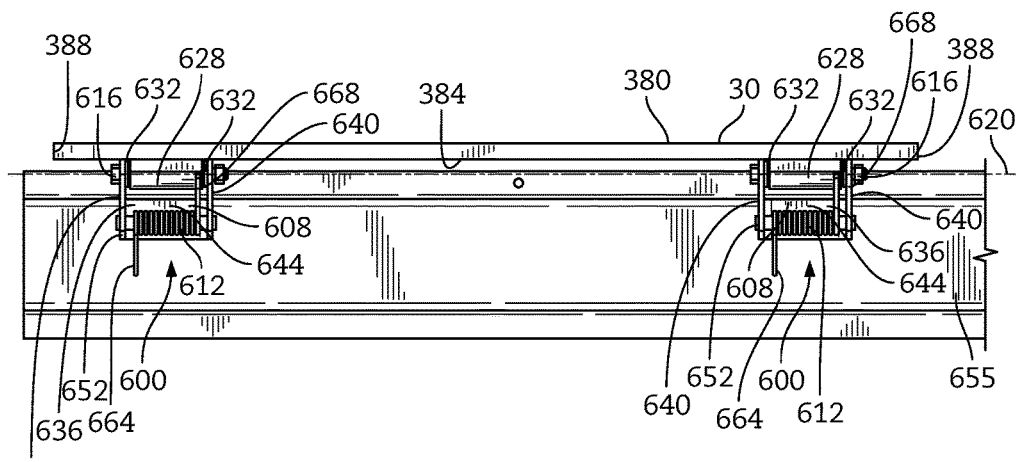
FIG. 30 is a front elevation view of the spring hinge of FIG. 28 in the open configuration.
Figure 31:
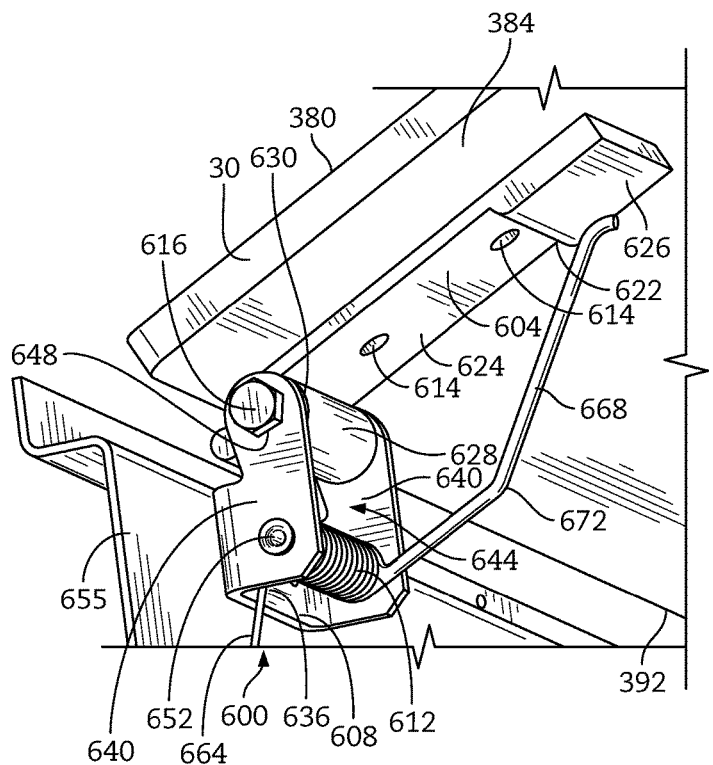
FIG. 31 is an enlarged bottom perspective view of the spring hinge of FIG. 28 in a partially closed configuration.
Figure 32:
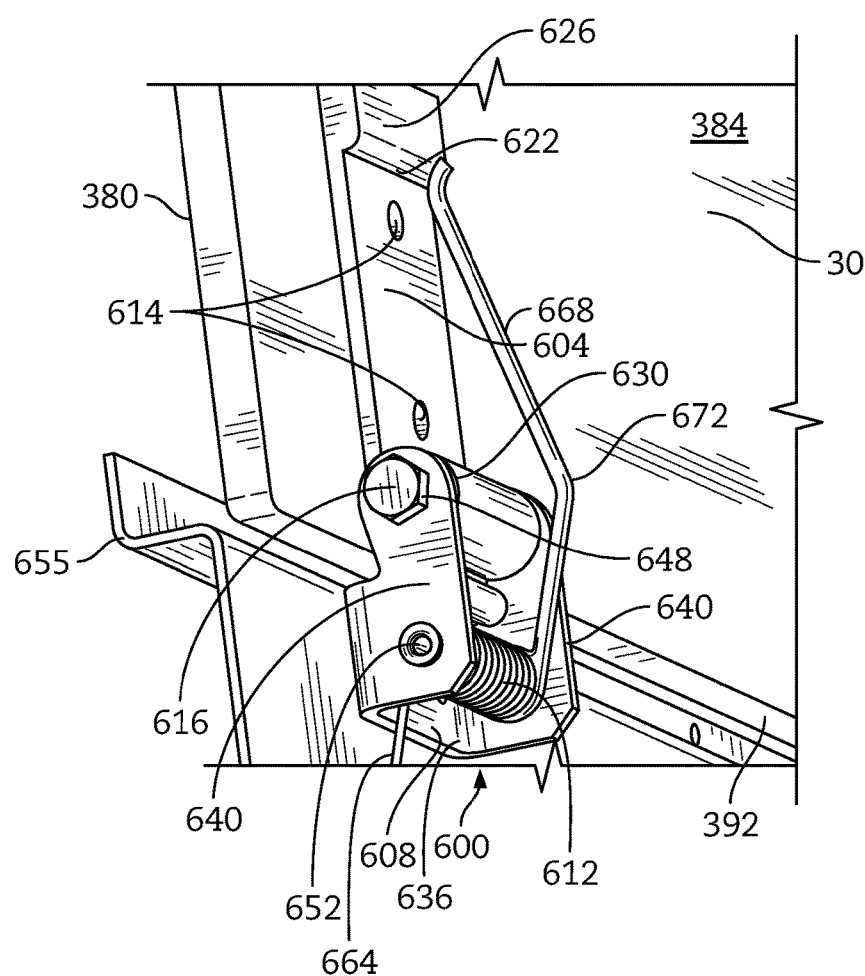
FIG. 32 is an enlarged front and bottom perspective view of the spring hinge of FIG. 28 in a closed configuration (i.e., oriented vertically).

The spring hinge 600 and the spring constant of the torsion spring 612 selectively allow movement of the load deck panels 30 from the vertical (or storage position) to the horizontal (or loading) position when the torsional force of the torsion spring 612 is overcome. Overcoming the linear force against the curved ledge 622 allows for hinged movement of the load deck panel 30 about the pivot axis 620, pivoting the inner edge 396 of the load deck panel 30 toward an inside of the conveyor trailer 10. The load deck panel 30 can pivot about the pivot axis 620 until the load deck panel comes into contact with the conveyor rail 22, defining the horizontal position, as shown in FIGS. 28-30. In the horizontal position, the first end 664 of the torsion spring 612 may slide over the curved ledge 622 into contact with the raised end 626. The spring constant of the torsion spring 612 is selected such that the load deck panel 30 remains in the horizontal position until rotated into the vertical position by a user. In this manner, the spring hinge 600 retains the load deck panel 30 in a vertical or horizontal position when desired and provides a lift assist when hinged movement between the vertical and horizontal position is desired.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A conveyor system for loading a trailer comprising a spring hinge for a load deck panel, the spring hinge comprising:
   a hinge butt portion configured to be coupled to a surface of a trailer;
   a hinge strap portion configured to be coupled to a bottom surface of the load deck panel; and
   a hinge pin coupling the hinge butt portion and the hinge strap portion, the hinge pin forming a pivot axis; and
   a position-assist element positioned below a bottom surface of the load deck panel,
   wherein the position-assist element is a torsion spring that is wound around a secondary hinge pin within the hinge butt portion, the torsion spring including an elongate arm extending toward the hinge strap portion, the hinge strap portion having a thickened end adjacent a curved ledge, the elongate arm of the torsion spring engaging the curved ledge and the thickened end, and
   wherein the position-assist element is configured to assist in hinged movement of the load deck panel about the pivot axis between a closed position in which the load deck panel is substantially vertical and an open position in which the load deck panel is substantially horizontal, and wherein the bottom surface of the load deck panel is disposed in a substantially horizontal orientation when in the open position.

2. The conveyor system of claim 1, wherein the hinge butt portion is coupled to a bracket that is coupled to a wall of the trailer.

3. A conveyor system for loading a trailer comprising a spring hinge for a load deck panel, the spring hinge comprising:
   a hinge butt portion configured to be coupled to a surface of a trailer;
   a hinge strap portion configured to be coupled to a bottom surface of the load deck panel; and
   a hinge pin coupling the hinge butt portion and the hinge strap portion, the hinge pin forming a pivot axis; and
   a position-assist element positioned below the bottom surface of the load deck panel and configured to assist in hinged movement of the load deck panel about the pivot axis between a closed position in which the load deck panel is substantially vertical and an open position in which the load deck panel is substantially horizontal, and wherein the bottom surface of the load deck panel is disposed in a substantially horizontal orientation when in the open position;
   wherein the position-assist element has a first end and a second end, the first end extends away from the hinge pin into contact with the bottom surface of the load deck panel, and the second end extends away from the hinge pin and includes two L-shaped turns to extend along and into contact with a surface within the trailer.

4. The conveyor system of claim 3, wherein the position-assist element further includes a spring having a spring constant, wherein the spring constant generates a torsional force that is translated into a linear force at the first and second ends of the position-assist element to retain the load deck panel in a vertical position when desired, but also to retain the load deck panel in a horizontal position when desired.

* * * * *